US 9,098,651 B2

(12) United States Patent
Kobayashi et al.

(10) Patent No.: US 9,098,651 B2
(45) Date of Patent: Aug. 4, 2015

(54) COMPUTER-READABLE RECODING MEDIUM IN WHICH THERMAL FLUID SIMULATION PROGRAM IS STORED, THERMAL FLUID SIMULATING DEVICE, AND METHOD FOR THERMAL FLUID SIMULATION

(75) Inventors: Sachio Kobayashi, Kawasaki (JP); Hiroki Kobayashi, Kawasaki (JP); Hideki Abe, Kawasaki (JP); Masayoshi Hashima, Kawasaki (JP); Yuichi Sato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 419 days.

(21) Appl. No.: 13/354,820

(22) Filed: Jan. 20, 2012

(65) Prior Publication Data
US 2012/0253757 A1 Oct. 4, 2012

(30) Foreign Application Priority Data

Mar. 30, 2011 (JP) ................. 2011-074710
Oct. 13, 2011 (JP) ................. 2011-225417

(51) Int. Cl.
G06F 7/50 (2006.01)
G06F 17/50 (2006.01)

(52) U.S. Cl.
CPC ........ *G06F 17/5009* (2013.01); *G06F 2217/16* (2013.01); *G06F 2217/80* (2013.01)

(58) Field of Classification Search
None
See application file for complete search history.

(56) References Cited

U.S. PATENT DOCUMENTS 6,266,071 B1 7/2001 Stam et al.

FOREIGN PATENT DOCUMENTS

JP 2007-179501 7/2007

OTHER PUBLICATIONS

Lang et al. Reduce Order Model Based on Principal Component Analysis for Process Simulation and Optimization Energy & Fuels 2009, 23, pp. 1695-1706.*
Ma et al. Reduced-order models for control of fluids using the eigensystem realization algorithm Theor. Comput. Fluid Dyn., Springer-Verlag, Feb. 3, 2010.*
Proefschrift (Reduction of Process Simulation Models: a proper orthogonal decomposition approach, Techische Universiteit Eindhoven, 2004.*
Treuille, A. et al., "Model Reduction for Real-time Fluids", Association for Computing Machinery, Inc., 2006, pp. 826-834.
Stam, J., "Stable Fluids", Association for Computing Machinery, Inc., 1999.

* cited by examiner

*Primary Examiner* — Omar Fernandez Rivas
*Assistant Examiner* — Cuong Luu
(74) *Attorney, Agent, or Firm* — Fujitsu Patent Center

(57) ABSTRACT

A prior simulation of a velocity field and a temperature field is carried out, and snapshot data of the velocity field and that of the temperature field are collected during the prior simulation. Then principal component analysis on the collected snapshot data obtains velocity-field and temperature field dimension transformation matrixes, on the based on which the analysis models of the velocity field and temperature field having respective first degrees of freedom are converted into reduced degree-of-freedom models. Consequently, a simulation of the velocity field and the temperature field is carried out using models having respective reduced degrees of freedom (i.e., second degrees of freedom).

15 Claims, 11 Drawing Sheets

FIG. 6

| time | index | name | value |
|---|---|---|---|
| 0.5 | 103 | point103 | 26.5 |
| 0.5 | 101 | point101 | 26.5 |
| 0.5 | 202 | monitor2 | 0.007508 |
| 0.5 | 204 | monitor4 | 0.031456 |
| 1 | 103 | point103 | 26.5 |
| 1 | 101 | point101 | 26.5 |
| 1 | 202 | monitor2 | 0.02856 |
| 1 | 204 | monitor4 | 0.072332 |
| 1.5 | 103 | point103 | 26.4994 |
| 1.5 | 101 | point101 | 26.4994 |
| 1.5 | 202 | monitor2 | 0.044876 |
| 1.5 | 204 | monitor4 | 0.100733 |
| 2 | 103 | point103 | 26.4825 |
| 2 | 101 | point101 | 26.4825 |
| 2 | 202 | monitor2 | 0.057992 |
| 2 | 204 | monitor4 | 0.128353 |
| 2.5 | 103 | point103 | 26.333 |
| 2.5 | 101 | point101 | 26.333 |
| 2.5 | 202 | monitor2 | 0.070162 |

FIG. 11

COMPUTER-READABLE RECODING MEDIUM IN WHICH THERMAL FLUID SIMULATION PROGRAM IS STORED, THERMAL FLUID SIMULATING DEVICE, AND METHOD FOR THERMAL FLUID SIMULATION

CROSS-REFERENCE TO RELATED APPLICATIONS

This application is based upon and claims the benefit of priorities of the prior Japanese Application No. 2011-074710 filed on Mar. 30, 2011 and the prior Japanese Application No. 2011-225417 filed on Oct. 13, 2011 in Japan, the entire contents of which are hereby incorporated by reference.

FIELD

The embodiment discussed herein is a thermal hydraulic simulation program that carries out a simulation of a fluid field and/or a temperature field, a thermal hydraulic simulating device, and a method of thermal hydraulic simulation.

BACKGROUND

In developing a product such as a server and in constructing a structure such as a data center, a thermal hydraulic simulation has been carried out to grasp the heat distribution and the flow of air beforehand for efficient thermal design.

Generally, a thermal hydraulic simulation previously sets a number of time steps that chronologically continue, and carries out a time series simulation in which the analysis through solving thermal hydraulic equations using analysis condition is repeated in the respective time steps.

Such a thermal hydraulic simulation involves a long calculation time for the following reasons (a1) and (a2):

(a1) difficulty in setting intervals between time steps large due to restriction in solution of the thermal hydraulic equations, that specifically is, the CFL (Courant-Friedrichs-Lewy) condition; and (a2) high cost to calculate the differential equations (thermal hydraulic equations) representing change in state in each time step.

In a simulation of an in compressible fluid that carries out a time series simulation similar to the above thermal hydraulic simulation, the following schemes (b1) and (b2) to deal with the increasing in calculation time for the above reasons (a1) and (a2) are known;

(b1) stable sequential solution that sequentially solves a differential equations, considering the respective terms independently from one another; and (b2) reduced analysis degree-of-freedom scheme that reduces the analysis degrees of freedom using the result of a prior calculation, keeping the principal unchanged.

A thermal hydraulic simulation is based on the Navier-Stokes equation that is differential equations that represent time fluctuation of fluid flow such as air flow. However, since the thermal hydraulic simulation is based on simultaneous equations of the Navier-Stokes equations and thermal advection diffusion equations that represent time fluctuation of heat, it is difficult to apply the above schemes (b1) and (b2), without being modified, to the thermal hydraulic simulation.

Accordingly, the thermal hydraulic simulation of an incompressible fluid have not considered solutions to the above (a1) and (a2) and therefore still take a long calculation time. For this reason, it is difficult to grasp a temperature distribution and the fluid flow in a short time.

SUMMARY

There is provided a non-transitory computer-readable recording medium in which a thermal hydraulic simulation program that carries out a simulation of a velocity field and/or a temperature field is stored, the program instructing a computer to execute: carrying out a first simulation of the velocity field and the temperature field, using a velocity-field analyzing model and a temperature-field analyzing model having respective first degrees of freedom; determining levels of reducing the first degrees of freedom on the basis of the result of the first simulation; calculating a velocity-field dimension transformation matrix and a temperature-field dimension transformation matrix that respectively reduce the degrees of freedom of the velocity-field analyzing model and the temperature-field analyzing model to respective second degrees of freedom by the levels of reducing determined; and converting the velocity-field analyzing model and the temperature-field analyzing model into reduced degree-of-freedom models having the second degrees of freedom using the velocity-field dimension transformation matrix and the temperature-field dimension transformation matrix calculated; and carrying out a second simulation of the velocity field and the temperature field using the reduced degree-of-freedom models.

There is provided a thermal hydraulic simulating device that carries out a simulation of a velocity field and/or a temperature field, including: a first simulator that carries out a first simulation of the velocity field and the temperature field, using a velocity-field analyzing model and a temperature-field analyzing model having respective first degrees of freedom; an analyzer that determines levels of reducing the first degrees of freedom on the basis of the result of the first simulation carried out by the first simulator and calculates a velocity-field dimension transformation matrix and a temperature-field dimension transformation matrix that respectively reduce the degrees of freedom of the velocity-field analyzing model and the temperature-field analyzing model to respective second degrees of freedom by the levels of reducing determined; and a second simulator that converts the velocity-field analyzing model and the temperature-field analyzing model into reduced degree-of-freedom models having the second degrees of freedom using the velocity-field dimension transformation matrix and the temperature-field dimension transformation matrix calculated by the analyzer, and carries out a second simulation of the velocity field and the temperature field using the reduced degree-of-freedom models.

There is provided a method for a thermal hydraulic simulation of a velocity field and/or a temperature field, comprising: carrying out a first simulation of the velocity field and the temperature field, using a velocity-field analyzing model and a temperature-field analyzing model having respective first degrees of freedom; determining levels of reducing the first degrees of freedom on the basis of the result of the first simulation; calculating a velocity-field dimension transformation matrix and a temperature-field dimension transformation matrix that respectively reduce the degrees of freedom of the velocity-field analyzing model and the temperature-field analyzing model to respective second degrees of freedom by the levels of reducing determined; and converting the velocity-field analyzing model and the temperature-field analyzing model into reduced degree-of-freedom models having the second degrees of freedom using the velocity-field dimension transformation matrix and the temperature-field dimension transformation matrix calculated; and carrying out a second simulation of the velocity field and the temperature field using the reduced degree-of-freedom models.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 6 is a diagram illustrating a second example (table) of displaying a result of a simulation carried out a thermal hydraulic simulating device of the first embodiment;

FIG. 11 is a diagram illustrating a position of a cell to be referred in a real dimension space for explaining a referring operator of the first embodiment.

DESCRIPTION OF THE PREFERRED EMBODIMENTS

Throughout the specification the terms of "degree of freedom" and "degree-of-freedom" are sometimes abbreviated to "DOF", and similarly the term of "degrees of freedom" is also sometimes abbreviated to "DOFs".

Hereinafter, a first embodiment will now be described with reference to the accompanying drawings.

Figure 1:
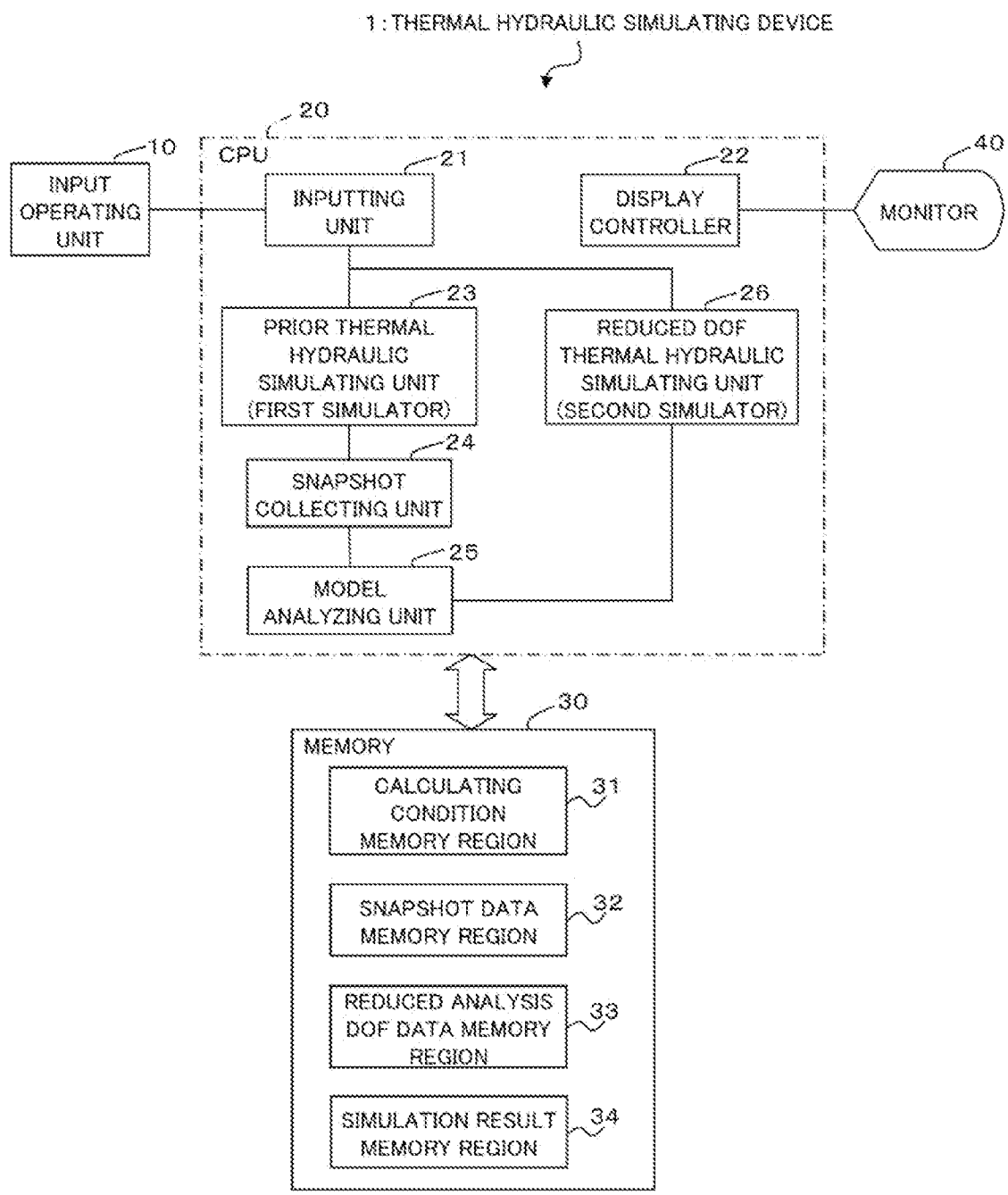
FIG. 1 is a block diagram schematically illustrating a hardware configuration and a functional configuration of a thermal hydraulic simulating device of a first embodiment.
Figure 2:
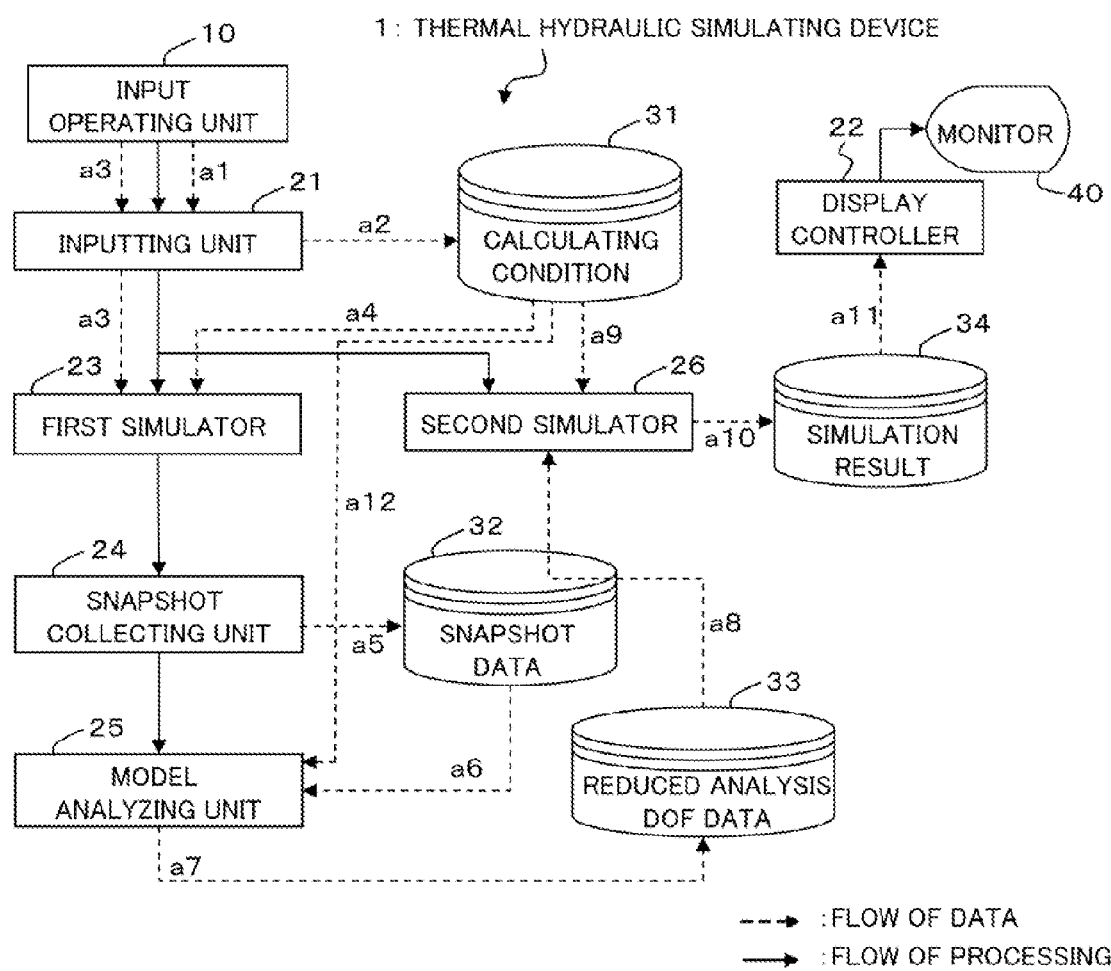
FIG. 2 is a diagram illustrating a functional configuration and operation of a thermal hydraulic simulating device of the first embodiment.

(1) Configuration and Function of a Thermal Hydraulic Simulating Device According to the First Embodiment FIG. 1 is a block diagram schematically illustrating the hardware configuration and the functional configuration of a thermal hydraulic simulating device 1 of the first embodiment; and FIG. 2 is a diagram illustrating the functional configuration and operation of the thermal hydraulic simulating device 1 of the first embodiment.

The thermal hydraulic simulating device 1 illustrated in FIGS. 1 and 2 carries out a simulation of a velocity field and/or a temperature field, and includes an input operating unit 10, a processor 20, a memory 30, and a monitor 40. Here the input operating unit 10 is a man-machine interface, which is operated by the user to input various data pieces into the thermal hydraulic simulating device 1, and is exemplified by a mouse and a keyboard. The processor 20 is a CPU (Central Processing Unit). The memory 30 may be an internal memory device such as a RAM (Random Access Memory), a ROM (Read Only Memory), a HDD (Hard Disk Drive), and an SSD (Solid State Drive), or may be an external memory device. The monitor 40 is a display such as a CRT (Cathode Ray Tube), and an LCD (Liquid Crystal Display).

The processor 20 executes a thermal hydraulic simulating program and thereby functions as an inputting unit 21, a display controller 22, a prior thermal hydraulic simulating unit 23, a snapshot collecting unit 24, a model analyzing unit 25, and a reduced DOF thermal hydraulic simulating unit 26, which are to be detailed below.

The memory 30 has memory regions 31-34 that respectively store calculating condition data, snapshot data, reduced analysis degree-of-freedom data and results of simulation, as to be detailed below, and additionally has a region (not illustrated) that stores the thermal hydraulic simulating program.

The monitor 40 displays various information pieces, such as results of the thermal hydraulic simulation stored in the memory region 34, under the control of the display controller 22 (see arrow a11 in FIG. 2)

The inputting unit 21 receives, before a thermal hydraulic simulation starts, various pieces of information that are to be used for the thermal hydraulic simulation and that the user inputs via the input operating unit 10 using the function of a GUI (Graphical User Interface) (see arrow a1 in FIG. 2), and stores the received pieces of information into the memory 30.

Here, the various pieces of information that are to be used for a thermal hydraulic simulation and that the inputting unit 21 sets include calculating condition data to be used in a thermal hydraulic simulation. The calculating condition data is stored in the memory region 31 (see arrow a2 in FIG. 2). The calculating condition data stored in the memory region 31 includes, for example, a shape model, physical property values, various boundary conditions, heat conditions, convergence conditions, resistance conditions, and flow conditions that are to be used in a thermal hydraulic simulation.

The prior thermal hydraulic simulating unit (first simulator) 23 follows instructions from the user through the input operating unit 10 via the inputting unit 21 (see arrow a3 in FIG. 2), and carries out a thermal hydraulic simulation (first simulation), that is a simulation a velocity field and/or a temperature field on the basis of the calculating condition stored in the memory region 31 (see arrow a4 in FIG. 2). At that time, the prior thermal hydraulic simulating unit 23 carries out the simulation on a velocity-field analyzing model and a temperature-field analyzing model having respective first degrees of freedom not being reduced (that is, real dimensions, more specifically the real dimension spaces having the first degrees of freedom).

The prior thermal hydraulic simulating unit 23 carries out the simulation on a velocity field and/or a temperature field using the following simultaneous differential equations (1)-(3) including Navier-Stokes equations and thermal advection equations. The simulation of a velocity field and a temperature field, i.e., the solution of the simultaneous differential equations (1)-(3) employs a stable sequential solution or a grid method disclosed in, for example, above Patent Literature 1. The first embodiment will be described assuming that the stable sequential solution is adopted. A stable sequential solution sequentially solves Navier-Stokes equations (see following formulae (1) and (4)) and thermal advection diffusion equations (see following formulae (3) and (17)), as to be detailed below, by considering the respective terms in the equations independently from one another, so that the simulation of the velocity field and the temperature field can be accomplished.

The snapshot collecting unit (collector) 24 collects snapshot data of the velocity field and the temperature field undergoing the simulation (first simulation) by the prior thermal hydraulic simulating unit 23 at respective predetermined timings. At that time, the snapshot collecting unit 24 exhaustively collects the snapshot data of the velocity field and the temperature field being in various states. Furthermore, since the velocity field fluctuates faster than the temperature field, the snapshot collecting unit 24 collects the snapshot data of the velocity field at intervals shorter than those for the snapshot data of the temperature field. The timings at which the snapshot collecting unit 24 collects the snapshot data are stored to be the calculation condition data in, for example, the memory region 31 in advance.

The snapshots of the velocity field that the snapshot collecting unit 24 collects is a velocity of the fluid which velocity is obtained as the result of the calculation of the prior thermal hydraulic simulating unit 23. The snapshots of the temperature filed that the snapshot collecting unit 24 collects is a distribution of temperature which distribution is obtained as the result of the calculation of the prior thermal hydraulic simulating unit 23. The snapshot data includes a number of snapshots of each of the velocity field and the temperature field. The snapshot data of the velocity field and the temperature field collected by the snapshot collecting unit 24 is stored in the memory region 32 (see arrow a5 in FIG. 2).

When a predetermined termination condition is satisfied, the prior thermal hydraulic simulating unit 23 and the collector 24 terminate the prior simulation (first simulation) and the collection of snapshot data. The termination condition that a predetermined time period is elapsed from the start of the prior simulation, that the calculation by the prior thermal hydraulic simulating unit 23 comes into a stationary state, or that desired snapshots (or snapshot data) are collected by the snapshot collecting unit 24. The termination condition is stored to be the calculating condition data in, for example, the memory region 31 in advance.

The model analyzing unit (analyzer) 25 carries out principal component analysis of snapshot data stored in the memory region 32 (see arrow a6 in FIG. 2), and thereby determines level of reducing the analysis degrees of freedom (DOFs) of the fluid flow and the temperature distribution. The model analyzing unit 25 further calculates dimension transformation matrixes that convert the analysis models of the real dimension to the reduced degree-of-freedom models.

Specifically, the analyzer 25 carries out principal component analysis on the snapshot data of the velocity field and that of the temperature field stored in the memory region 32 and thereby determines levels of reducing the analysis degrees of freedom (first DOFs) to second DOFs. Accordingly, the second DOFs are smaller than the respective corresponding first DOFs. At that time, the analyzer 25 determines the number of dimensions of an eigenvector having a cumulative contribution degree, obtained as the result of the principal component analysis on the velocity field, being a predetermined value or more to be the second DOF of the velocity field and similarly determines the number of dimensions of an eigenvector having a cumulative contribution degree, obtained as the result of the principal component analysis on the temperature field, being a predetermined value or more to be the second DOF of the temperature field.

The analyzer 25 calculates a velocity-field dimension transformation matrix that reduces the first velocity-field DOF (i.e., real dimension of the velocity field) to the second velocity-field DOF determined for the velocity field by the determined level of reducing. Similarly, the analyzer 25 calculates a temperature-field dimension transformation matrix that reduces the first temperature-field DOF (i.e., real dimension of the temperature field) to the second temperature-field DOF determined for the temperature field by the determined level of reducing. The velocity-field dimension transformation matrix and the temperature-field dimension transformation matrix calculated by the analyzer 25 are stored, as reduced analysis DOF data, in the memory region 33 (see arrow a7 in FIG. 2).

The reduced DOF thermal hydraulic simulating unit (second simulator) 26 converts the velocity-field and temperature-field analysis models into the respective reduced degree-of-freedom models using the velocity-field dimension transformation matrix and the temperature-field dimension transformation matrix stored in the memory region 33 (see arrow a8 in FIG. 2). The reduced DOF thermal hydraulic simulating unit 26 carries out simulation (second simulation) of the velocity field and the temperature field using the reduced DOF models having the second DOFs on the basis of the calculating condition stored in the memory region 31 (see arrow a9 in FIG. 2). The result of the simulation carried out by the reduced DOF thermal hydraulic simulating unit 26 is stored in the memory region 34 (see arrow a10 in FIG. 2). The simulation result stored in the memory region 34 is displayed on the monitor 40 under the control of the display controller 22 (see arrow a11 in FIG. 2), but may alternatively be printed out by a printer (not illustrated). The process of arrow a12 of FIG. 2 will be detailed in the following item (4).

(2) Operation of the Thermal Hydraulic Simulating Device of the First Embodiment Next, description will now be made in relation to operation of the thermal hydraulic simulating device 1 having the above configuration with reference to FIGS. 3-9.

(2-1) Outline of the Operation of the Thermal Hydraulic Simulating Device:

The thermal hydraulic simulating device 1 of the first embodiment carries out a prior simulation (first simulation) by solving seven equations that consider the respective terms of incompressible Navier-Stokes equations and thermal advection diffusion equations independently one another with the intention of high-speed thermal hydraulic simulation. The first DOFs of the analysis models are reduced to the second DOFs based on the result of the prior thermal hydraulic simulation (i.e., the snapshot data) and the simultaneous differential equations using the reduced DOF models having the second DOFs are solved, so that the fluid flow caused by the temperature difference between the object component and the ambient air is modeled in the form of buoyancy.

Specifically, the thermal hydraulic simulating device 1 adopts the above scheme (b2), that is, a recued analysis DOF scheme that reduces the first DOFs using the result of the prior analysis, extended to analysis of the thermal hydraulic. Namely, the prior thermal hydraulic simulating unit 23 carries out a thermal hydraulic simulation analysis on the analysis object in advance, and the analyzer 25 then analyzes the essential DOFs of the analysis object through principal component analysis on the result of the prior simulation and thereby derives, for each of the velocity field and the temperature field, transformation matrix to convert the analysis model into reduced analysis DOF model. After that, the reduced DOF thermal hydraulic simulating unit 26 solves the simultaneous differential equations improved so as to treat the reduced DOF models so that time series simulation of thermal hydraulic can be accomplished.

The speed of the prior simulation carried out by the prior thermal hydraulic simulating unit 23 is enhanced through, for example, the above scheme (b1) of the stable sequential solution, which is a speed-enhanced scheme of a grid method that is one of the thermal hydraulic simulations currently practiced. Here, an incompressible Navier-Stoke equation has four terms (see Formula (4) below), and a thermal advection diffusion equation has three terms (see Formula (17) below). The stable sequential solution establishes seven equations each of which considers influence of only one of the seven terms in the incompressible Navier-Stoke equation and the thermal advection diffusion equation. The seven established equations are simple and therefore can be stably solved with respect to the respective terms. For the above, the stable sequential solution can set time intervals of time steps of the time series simulation to be wide, so that the speed of the prior thermal hydraulic simulation can be enhanced.

In this embodiment, the fluid flow caused by the temperature difference between the object component and the ambient air is modeled in the form of buoyancy and incorporated as an external force term (see the external force term (A) in Formula (4) below) into the Navier-Stokes equation. Thereby, influence of the fluid flow caused by heat can be considered in the Navier-Stokes equation.

The manner of the thermal hydraulic simulation of this embodiment will be detailed with reference to following FIGS. 3 and 4 and Formulae (1)-(40).

(2-2) Flow of Processing Performed in the Thermal Hydraulic Simulating Device:

Next, description will now be made in relation to processing performed in the thermal hydraulic simulating device 1 of the first embodiment with reference to flow diagram (steps S11-S22) of FIG. 3.

The inputting unit 21 receives, before the simulation starts, various pieces of information that are to be used for the thermal hydraulic simulation, that is the calculating condition data here, and that are input from the user via the input operating unit 10, and stores the received pieces of information in memory region 31 of the memory 30 (step S11). The calculating condition data includes, for example, a shape model, physical property values, various boundary conditions, heat conditions, convergence conditions, resistance conditions, and flow conditions that are to be used in a thermal hydraulic simulation.

In succession, upon the inputting unit 21 receives an instruction of executing the thermal hydraulic simulation input by the user via the input operating unit 10, the thermal hydraulic simulation starts (step S12). After the start of the simulation, the prior thermal hydraulic simulating unit 23 carries out a simulation (i.e., the prior thermal hydraulic simulation) of the velocity field and the temperature field using the velocity-field analysis model and the temperature-field analysis mode having the DOFs not being reduced through the stable sequential solution (step S13). The stable sequential solution carried out in the prior thermal hydraulic simulation in step S13 is detailed in the following item (2-4) with reference to Formulae (4)-(22).

During the prior thermal hydraulic simulation by the prior thermal hydraulic simulating unit 23, the snapshot collecting unit 24 collects two or more snapshots for each of the velocity field (flow of the fluid, the state of the flow) and the temperature field (temperature distribution) (step S14). A snapshot is a velocity field or a temperature field is extracted at a predetermined timing previously set in the memory region 31, and is stored in the memory region 32. The collecting of snapshots (i.e. sample collection) will be detailed in the following item (2-5-1).

Upon the snapshot collecting unit 24 collects snapshots at a certain timing, determination is made, on the basis of the termination condition predetermined in the memory region 31, whether the prior simulation by the first simulator 23 and the collection by the snapshot collecting unit 24 are to be terminated (step S15). If the termination condition is not satisfied and the prior simulation and furthermore the snapshot collection do not terminate yet (NO route of step S15), processes of steps S13 and S14 are repeated. Conversely, if the termination condition is satisfied (YES route in step S15), in other words, if a predetermined time period is elapsed from the start of the prior simulation, the prior simulation comes into a stationary state, or collection of desired snapshots is completed by the snapshot collecting unit 24, the processing of step S16 is to be carried out.

If the termination condition is satisfied, the analyzer 25 carries out principal component analysis on the snapshot data of the velocity field and that of the temperature field stored in the memory region 32 (step S16). The principal component analysis on snapshot data will be detailed in the following item (2-5-2) with reference to Formulae (23)-(25).

Then, on the basis of the result of the principal component analysis, the analyzer 25 determines levels of reducing analysis DOFs (first DOFs, real dimension) to the lower second DOFs for the snapshot data of the velocity field and that of the temperature field (step S17). At that time, the number of dimensions of each of eigenvectors having a cumulative contribution degree, obtained as the result of the principal component analysis, being a predetermined value or more to be the second DOF of the corresponding field (i.e., the velocity field or the temperature field). The determination of the levels of reducing the first DOFs to the second DOFs will be detailed in the item (2-5-3) below.

Next, the analyzer 25 calculates a velocity-field dimension transformation matrix and a temperature-field dimension transformation matrix, which are then stored, as reduced analysis DOF data, in the memory region 33 (step S18). Here, the velocity-field dimension transformation matrix converts the velocity-field analysis model having the first DOF (real dimension of the velocity field) to a velocity-field reduced DOF model having the second DOF determined on the basis of the reducing level determined for the velocity field, and the temperature-field dimension transformation matrix converts the temperature-field analysis model having the first DOF (real dimension of the temperature field) to a temperature-field reduced DOF model having the second DOF determined on the basis of the reducing level determined for the temperature field. Calculation of the dimension transformation matrixes will be detailed in the item (2-5-3) below.

After the dimension transformation matrixes are calculated, the second simulator 26 carries out the thermal hydraulic simulation (second simulation) on the reduced analysis DOF models under the state of reducing DOFs (i.e., in reduced analysis DOF spaces having the second DOFs) obtained using the velocity-field dimension transformation matrix and the temperature-field dimension transformation matrix (step S19). Specifically, the second simulator 26 converts the velocity-field analysis model and the temperature-field analysis model into the respective reduced DOF models using the velocity-field dimension transformation matrix and the temperature-field dimension transformation matrix. The second simulator 26 carries out the simulations of the velocity field and the temperature field having the respective second analysis DOFs under the calculating condition (analysis condition) stored in the memory region 31. The result of the simulations carried out by the second simulator 26 is stored in the memory region 34. The simulation under a state of reduced analysis DOFs will be detailed the item (2-6) below with reference to following Formulae (30)-(40).

Upon completion of the thermal hydraulic simulation of a single time step at step S19, a determination is made whether now is the timing of displaying the simulation result (step S20). The timing of displaying a simulation result is preset in the predetermined region of the memory 30, and when the timing of displaying comes (YES route in step S20), the simulation result stored in the memory region 34 is displayed on the monitor 40 under the control of the display controller 22 (step S21). After the displaying, the procedure of flow diagram FIG. 3 returns to step S19, but may alternatively move to step S22. The processing of displaying a simulation result will be detailed in item (2-7) with reference to FIGS. 5-9.

Conversely, when the timing of displaying does not come yet (NO route in step S20) or after the simulation result is displayed, a determination is made, on the basis of a termination condition, whether the simulation is to be terminated (step S22). The termination condition here is that a predetermined time period is elapsed from the start of the simulation or the calculation by the second simulator 26 comes into a stationary state. If the termination condition is not satisfied and the simulation is not terminated yet (NO route in step S22), the procedure performed in the thermal hydraulic simulating device 1 returns to step S19. In contrast, if the termination condition is satisfied and the simulation is to be terminated (YES route in step S22), the thermal hydraulic simulating device 1 terminates the procedure.

(2-3) Thermal Hydraulic Simulation of Incompressible Fluid:

Generally, a thermal hydraulic simulation sets a number of time steps that chronologically continue, and carries out a time series simulation that repeats the calculation in units of time step. The calculation of each time step obtains time evolution of the velocity field and the temperature field through solving the following simultaneous differential equations (1)-(3). Here, equation (1) corresponds to Navier-Stokes equation that is a nonlinear partial differential equation that describes fluid motion; equation (2) corresponds to continuous formula derived from law of conservation of mass concerning a flow of an incompressible fluid; and equation (3) corresponds to a thermal advection diffusion equation that describes the conduction of heat in the fluid.

$$\dot{u} = -(u \cdot \nabla)u + v\nabla^2 u - \frac{1}{\rho}\nabla p + f \quad (1)$$

$$\nabla \cdot u = 0 \quad (2)$$

$$\dot{T} = -(u \cdot \nabla)T + \kappa \nabla^2 T + S \quad (3)$$

In these equations (1)-(3), the symbol "u" represents a velocity vector of a fluid; the symbol "p" represents a pressure; the symbol "ρ" represents a density; the symbol "f" represents an external force vector affects per unit weight; the symbol "ν" presents a coefficient of kinematic viscosity; the symbol "T" represents temperature; the symbol "κ" represents a coefficient of conduction of heat; the symbol "S" represents a heat value received from the outside; and the symbol nabla "∇" represents a space derivative operator. The symbols "u" and "T" with dots on the top in the left sides of the equations (1) and (3) represent partial differences of the velocity vector "u" and the temperature "T" with respect to time t, respectively. Hereinafter, a bold character in a formula means that the data related to the character is a vector or a matrix.

Figure 4A:
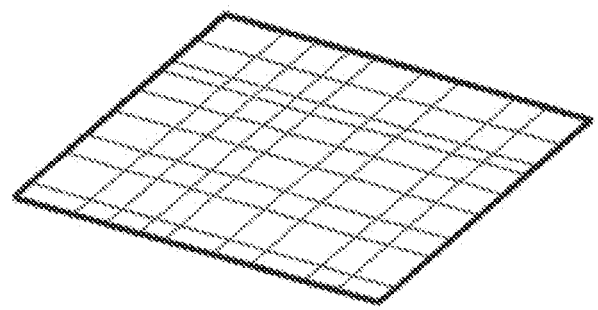
FIGS. 4A and 4B are diagrams illustrating grid models used in a thermal hydraulic simulation.
Figure 4B:
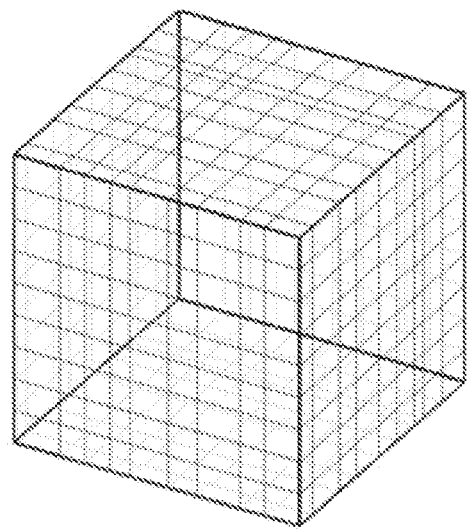

In a thermal hydraulic simulation of an incompressible fluid performed on a computer by solving the above simultaneous differential equations (1)-(3), the analysis space is discretized so that the simulators 23 and 26 discretely calculates differential values. An example of a discretization is to divide the continuous analysis space into grids as depicted in FIGS. 4A and 4B. Here, each rectangle or each rectangular parallelepiped defined by grids is referred to as a cell. FIGS. 4A and 4B represent grid models used in a thermal hydraulic simulation: specifically, FIG. 4A represents a two-dimensional grid model; and FIG. 4B represents a three-dimensional grid model.

(2-4) Stable Sequential Solution:

As described above, this embodiment adopts a stable sequential solution to the prior analysis that the first simulator 23 carries out. A stable sequential solution is a high-speed grid method that is one of thermal hydraulic simulation schemes already practiced. Here, an incompressible Navier-Stoke equation has four terms (see Formula (4) below), and a thermal advection diffusion equation has three terms (see Formula (17) below). The stable sequential solution establishes seven equations each of which considers influence of only one of the seven terms in the incompressible Navier-Stoke equation and the thermal advection diffusion equation. The seven established equations are simple and therefore can be stably solved with respect to the respective terms. For the above, the stable sequential solution can set time intervals of time steps of the time series simulation to be wide, so that the speed of the prior thermal hydraulic simulation by the first simulator 23 can be enhanced.

Namely, this embodiment expands the stable sequential solution, which is generally applied to an incompressible fluid simulation, to an incompressible fluid simulation to be carried out by the first simulator 23. Consequently, the speed of the prior simulation can be enhanced. Hereinafter, a stable sequential solution will now be detailed.

An incompressible fluid here represents a fluid having a non-changing density. If there is no need to assume a circumference where a fluid propagates faster than the velocity of sound, gas such as air can be considered as an incompressible fluid. The velocity of sound in the air is 340 m/sec.

An incompressible fluid simulation is accomplished by simultaneously satisfying both the Navier-Stokes equation (1) that describes fluid motion and the continuous formula (2) derived from law of conservation of mass concerning a flow of an incompressible fluid for time evolution.

Hereinafter, description will now be made in relation to a procedure of obtaining time evolution of the velocity vector $u_0$ and the temperature $T_0$ at time t by the first simulator 23 (at step S13 of FIG. 3) and thereby obtaining the velocity vector $u_1$ and the temperature $T_1$ at the time t+Δt after time Δt.

(2-4-1) Stable Sequential Solution of Navier-Stokes Equation:

In stable sequential solution, the Navier-Stokes equation of Formula (4) is solved through separating the four terms (A)-(D) on the right side from one another. The solutions of the respective terms (A)-(D) are described below. Here, the term (A) is an external force term; the term (B) is an advection term; the term (C) is a diffusion term; and the term (D) is a pressure term.

$$\dot{u} = \underbrace{-(u \cdot \nabla)u}_{(B)} + \underbrace{v\nabla^2 u}_{(C)} \underbrace{-\frac{1}{\rho}\nabla p}_{(D)} + \underbrace{f}_{(A)} \quad (4)$$

(Sub-Step 1) Calculation of External Force Term (A):

First of all, following Formula (5) is established which considers influence only of the external force term (A) in Formula (4) and an intermediate velocity vector $u_{step1}$ is obtained using following Formula (5).

$$\dot{u}_{step1} = f \quad (5)$$

Here, in order to consider the influence of fluid flow due to heat, the fluid flow caused by the temperature difference from the ambient air is modeled in the form of buoyancy, which is then substituted for the external force term (A) of the Navier-Stokes equation (1). Representing standard temperature, a coefficient of thermal expansion, and a vector of acceleration of gravity by Tr, α, and g, respectively, the buoyancy f is expressed by following Formula (6).

$$f = -(T-T_r)\alpha g \quad (6)$$

Formula (7) is obtained by discretizing Formula (5) using the initial velocity vector $u_0$ and above Formula (6).

$$u_{step1} = u_0 - \Delta t(T-T_r)\alpha g \quad (7)$$

(Sub-Step 2) Calculation of Advection Term (B)

Using the intermediate velocity vector $u_{step1}$ obtained by the calculation of Sub-Step 1, following Formula (8) is established which considers influence only of the advection term (B), and an intermediate velocity vector $u_{step2}$ is obtained using following Formula (8).

$$\dot{u}_{step2} = -(u_{step1} \cdot \nabla)u_{step1} \quad (8)$$

The advection term (B) is calculated by Semi-Lagrange scheme, which assumes that the physical values of a virtual fluid particle do not change on a path on which the particles moves during time Δt. On this assumption, the positions of fluid particles, positioning all the grid points at time t, positioned before time Δt are calculated. For example, the position $p_0$ of a particle, locating at position p at time t, at time t−Δt is expressed by following Formula (9). Here, the bold symbols p and $p_0$ are vectors that indicate the positions of a fluid particle. A technique disclosed in "CFD SAIZENSEN (forefront technique)" (The Japan Society of Mechanical Engineers, KYORITSU SHUPPAN Co. Ltd., 2007).

$$p_0 = p - u_{step1}\Delta t \quad (9)$$

Representing a velocity vector at the position obtained by interpolating the velocity of a close grid point by $u_{step1}$ ($p_0$, t−Δt), the velocity $u_{step2}$ on the position p at time t is expressed by following Formula (10). Consequently, the equation (8) is solved in the above manner.

$$u_{step2} = u_{step1}(p_0, t-\Delta t) \quad (10)$$

In calculus of finite difference, which is used for obtaining a normal advection term (B), unless a distance (velocity x Δt) of transmitting information after time Δt is the width of grid or less, the CFL condition lowers the accuracy, which makes it difficult to set a large time step. However, Semi-Lagrange scheme can be carried out regardless the CFL condition related to the advection term (B), and therefore can set a large time step.

(Sub-Step 3) Calculation of Diffusion Term (C):

Using the intermediate velocity vector $u_{step2}$ obtained by the calculation of Sub-Step 2, following Formula (11) is established which considers influence only of the diffusion term (C) and an intermediate velocity vector $u_{step3}$ is obtained using following Formula (11).

$$\dot{u}_{step3} = v\nabla^2 u_{step2} \quad (11)$$

The right side of Formula (11) is discretized by applying the intermediate velocity vector $u_{step3}$ and thereby following formula (12) is obtained.

$$\frac{u_{step3} - u_{step2}}{\Delta t} = v\nabla^2 u_{step3} \quad (12)$$

Formula (12) is transformed into following simultaneous equation (13). Solving equation (13) obtains an intermediate velocity vector $u_{step3}$.

$$(I - v\nabla t\nabla^2)u_{step3} = u_{step} \quad (13)$$

(Sub-Step 4) Calculation of Pressure Term (D):

Following equation (14) is established which considers influence only of the pressure term (D), and the left side of equation (14) is discretized as following Formula (15). Using the intermediate velocity vector $u_{step3}$ obtained by the calculation of Sub-Step 3 and following Formula (15), an intermediate velocity vector $u_{step4}$ is obtained.

$$\dot{u}_{step4} = -\frac{1}{\rho}\nabla p \quad (14)$$

$$\frac{u_{step4} - u_{step3}}{\Delta t} = -\frac{1}{\rho}\nabla p \quad (15)$$

Here, when the divergences of both sides of Formula (15) are calculated and Formula (15) is arranged, considering Formula (2) related to incompressible condition, following simultaneous equation (16) is obtained. Solving simultaneous equation (16) obtains the pressure p. An intermediate velocity vector $u_{step4}$ is obtained by applying the obtained pressure p to Formula (15).

$$\nabla^2 p = \frac{\rho}{\Delta t}\nabla \cdot u_{step3} \quad (16)$$

(2-4-2) Stable Sequential Solution of Thermal Advection Diffusion Equation:

Next, the thermal advection diffusion equation (3) is solved in the same manner as the above. Specifically, three terms (E)-(G) on the right side of the thermal advection diffusion equation (17) are separated from one another and then the equations are solved. The solutions of the respective terms (E)-(G) are described below. Here, the term (E) is a generation term; the term (F) is a thermal advection term; and the term (G) is a thermal diffusion term.

$$\dot{T} = \underbrace{-(u \cdot \nabla)T}_{(F)} + \underbrace{\kappa\nabla^2 T}_{(G)} + \underbrace{S}_{(E)} \quad (17)$$

(Sub-Step 5) Calculation of Generation Term (E):

Following Formula (18) is established which considers influence only of the generation term (E) of Formula (17), and an intermediate temperature $T_{step5}$ is obtained using following Formula (18).

$$\dot{T}_{step5} = S \quad (18)$$

Following Formula (19) is obtained by discretizing Formula (18) using the initial temperature T.

$$T_{step5} = T_0 - \Delta t S \quad (19)$$

(Sub-Step 6) Calculation of Thermal Advection Term (F):

Using the intermediate velocity vector $u_{step4}$ and the intermediate temperature $T_{step5}$ respectively obtained in the calculations of Sub-Step 4 and Sub-Step 5, following Formula (20) is established which considers influence only of the thermal advection term (F), and an intermediate temperature $T_{step6}$ is obtained using following Formula (20).

The thermal advection term (F) is calculated through Semi-Lagrange scheme the same as Sub-Step 2, and thereby an intermediate temperature $T_{step6}$ is obtained.

$$\dot{T}_{step\,6} = -(u_{step\,4} \cdot \nabla) T_{step\,5} \quad (20)$$

(Sub-Step 7) Calculation of a Thermal Diffusion Term (G):

Using the intermediate temperature $T_{step6}$ obtained in the calculation of Sub-Step 6, following Formula (21) is established which considers influence of only the thermal diffusion term (G), and an intermediate temperature $T_{step7}$ is to be obtained using following Formula (21).

$$\dot{T}_{step7} = \kappa \nabla^2 T_{step6} \quad (21)$$

Applying the intermediate temperature $T_{step7}$ to the right side of Formula (21) discretizes and arranges the left side of Formula (21), and consequently obtains following simultaneous equation (22).

$$(1 - \kappa \Delta t \nabla^2) T_{step7} = T_{step6} \quad (22)$$

Solving the above Formula (22) obtains an intermediate temperature $T_{step7}$.

The intermediate velocity vector $u_{step4}$ and the intermediate temperature $T_{step7}$ obtained in the above manner are respectively regarded as a velocity vector $u_1$ and a temperature $T_1$ at a time after time $\Delta t$ from time t.

(2-5) Calculation of Dimension Transformation Matrixes:

Next, detailed description will now be made in relation to processing performed by the snapshot collecting unit 24 and the model analyzing unit 25, that is, processing of steps S14, and S16-S18 of FIG. 3.

(2-5-1) Prior Thermal Hydraulic Simulation and Sample Collection:

Before the model analyzing unit 25 calculates the dimension transform matrixes, the prior thermal hydraulic simulation is carried out in a state of not reducing the analysis DOFs through the stable sequential solution described in the above item (2-4) or Marker And Cell (MAC) scheme, which is disclosed in, for example, Francis H. Harlow and J. Eddie Welch, "Numerical Calculation of Time-Dependent Viscous Incompressible Flow of Fluid with Free Surface", Phys. Fluids 8, 2182 (1965).

Figure 3:
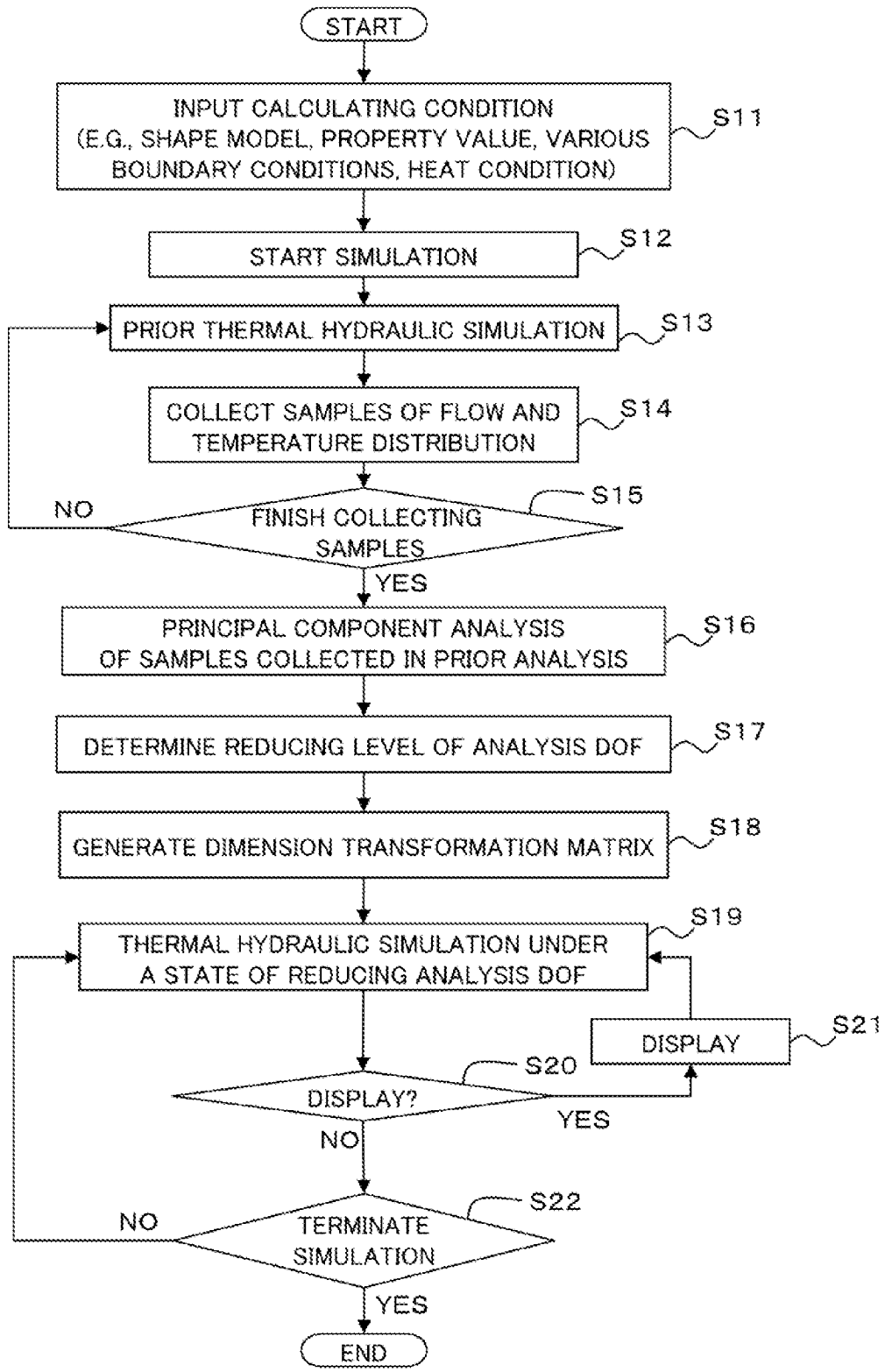
FIG. 3 is a diagram illustrating a flow of processing of a thermal hydraulic simulating device of the first embodiment.

During the prior thermal hydraulic simulation, the snapshot collecting unit 24 collects a number of snapshots (samples) by extracting the temperature field and the velocity field at respective particular timings (step S14 in FIG. 3).

At that time, the prior thermal hydraulic simulation is carried out under analysis condition variously changing or chronologically fluctuating, so that the snapshots of the velocity field and those of the temperature field in which various states are reflected are exhaustively collected. In addition, since the velocity field fluctuates faster than the temperature field, the snapshot collecting unit 24 collects the snapshot data of the velocity field at intervals shorter than that of collecting the snapshot data of the temperature field. Thereby, the snapshots of the velocity field and those of the temperature field in which various states are reflected can be surly collected.

(2-5-2) Principal Component Analysis on Snapshots:

The model analyzing unit 25 carries out Principal Component Analysis (PCA) on the snapshot data of the velocity field and that of the temperature field (step S16 in FIG. 3).

Firstly, description is made in relation to the principal component analysis on the snapshot data of the velocity field.

One snapshot is extracted from a number (for example, 1) of snapshots, and a vector $u^i$ expressing the velocity field of all the grid points in the form of a vector is examined. If the analysis model is in the three dimension, vector $u^i$ is expressed by following Formula (23). The vector $u^i$ is based on the snapshots obtained serving as a result of the prior simulation, and therefore satisfies Formula (2) related to the incompressible condition and the boundary condition of the wall.

$$u^i = \begin{pmatrix} ux_1^i \\ uy_1^i \\ uz_1^i \\ \vdots \\ \vdots \\ ux_{cn}^i \\ uy_{cn}^i \\ uz_{cn}^i \end{pmatrix} \quad (23)$$

Here, components $ux_k^i$, $uy_k^i$, and $uz_k^i$ represent the velocity (x, y, and z components) of a grid point k in the snapshot i, and the cn corresponds to the total number of grid points.

Here, the base U obtained by collecting vectors $u^i$ is expressed by the following Formula (24).

$$U = [u^1, u^2, \ldots, u^l] = \begin{pmatrix} ux_1^1 & ux_1^2 & \ldots & \ldots & \ldots & ux_1^l \\ uy_1^1 & uy_1^2 & \ldots & \ldots & \ldots & uy_1^l \\ uz_1^1 & uz_1^2 & \ldots & \ldots & \ldots & uz_1^l \\ \vdots & \vdots & \ddots & \ddots & \ddots & \vdots \\ \vdots & \vdots & \ddots & \ddots & \ddots & \vdots \\ ux_{cn}^1 & ux_{cn}^2 & \ldots & \ldots & \ldots & ux_{cn}^l \\ uy_{cn}^1 & uy_{cn}^2 & \ldots & \ldots & \ldots & uy_{cn}^l \\ uz_{cn}^1 & uz_{cn}^2 & \ldots & \ldots & \ldots & uz_{cn}^l \end{pmatrix} \quad (24)$$

Principal component analysis is carried out on a square matrix transformed by using $UU^T$ based on an n-dimensional base U, and an n-dimensional orthogonal base B in which eigenvectors $b^i$ are arranged in the order of larger magnitude of corresponding eigenvalues is obtained as following Formula (25).

$$B = [b^1, b^2, \ldots, b^n] \quad (25)$$

-continued $$\begin{pmatrix} bx_1^1 & bx_1^2 & \ldots & bx_1^n \\ by_1^1 & by_1^2 & \ldots & by_1^n \\ bz_1^1 & bz_1^2 & \ldots & bz_1^n \\ \vdots & \vdots & \ddots & \vdots \\ \vdots & \vdots & \ddots & \vdots \\ bx_{cn}^1 & bx_{cn}^2 & \ldots & bx_{cn}^n \\ by_{cn}^1 & by_{cn}^2 & \ldots & by_{cn}^n \\ bz_{cn}^1 & bz_{cn}^2 & \ldots & bz_{cn}^n \end{pmatrix}$$

(2-5-3) Determination of Dimension Transformation Matrixes:

On the basis of the result of the principal component analysis, the model analyzing unit 25 determines the second DOF m smaller than the analysis DOF (i.e., real dimension, first DOF) by the level of reducing on the basis of the snapshot data of the velocity field in the following manner.

Here, the matrix P of Formula (26) is considered which uses the first through m-th (m<n) eigenvectors $b^1, b^2, \ldots,$ and $b^m$ of the n-dimensional orthogonal base B.

$$P = \begin{pmatrix} bx_1^1 & bx_1^2 & \ldots & bx_1^m \\ by_1^1 & by_1^2 & \ldots & by_1^m \\ bz_1^1 & bz_1^2 & \ldots & bz_1^n \\ \vdots & \vdots & \ddots & \vdots \\ \vdots & \vdots & \ddots & \vdots \\ bx_{cn}^1 & bx_{cn}^2 & \ldots & bx_{cn}^m \\ by_{cn}^1 & by_{cn}^2 & \ldots & by_{cn}^m \\ bz_{cn}^1 & bz_{cn}^2 & \ldots & bz_{cn}^m \end{pmatrix} \quad (26)$$

The second DOF m is determined by the model analyzing unit 25. For example, the number of dimensions of an eigenvector having a cumulative contribution degree, obtained as the result of the principal component analysis, being a predetermined value or more is determined to be the second DOF m of the velocity field. The orthogonal base P determined in the above manner is called a dimension transformation matrix. In particular, the orthogonal base P calculated here serves as the velocity-field dimension transformation matrix. Using of an m-dimensional velocity-field dimension transformation matrix P expresses an n-dimensional vector u expressing the velocity field of an entire snapshot in following Formula (27) in which an m-dimensional vector r is used.

$$u = Pr \quad (27)$$

As the above, use of the velocity-field dimension transformation matrix P makes it possible to express an analysis model having a first DOF n in a model having a second DOF m. In addition, use of the inverse matrix (28) of the velocity-field dimension transformation matrix P makes it possible to carry out inverse transformation, which is called "reducing in analysis DOF".

$$r = P^T u \quad (28)$$

Carrying out the above procedure also on a group of samples collected for the temperature field can determine a DOF transformation matrix of the temperature field, that is, the temperature-field dimension transformation matrix Q. Use of the temperature-field dimension transformation matrix Q makes it possible to express a column vector s of the temperature field after reducing the DOF by the following Formula (29). Here, the symbol T represents a column vector of the temperature field before reducing the DOF.

$$s = Q^T T \quad (29)$$

(2-6) Thermal Hydraulic Simulation Under a Reduced Analysis DOF Scheme:

After the velocity-field dimension transformation matrix P and the temperature-field dimension transformation matrix Q are calculated, the second simulator 26 carries out the thermal hydraulic simulation under the state of reduced analysis DOFs (i.e., the second DOFs) using the calculated dimension transformation matrixes P and Q (step S19 in FIG. 3). The thermal hydraulic simulation is specifically carried out in the following manner.

In a time series physical simulation, a state $u(t+\Delta t)$ which forwards a state (vector) $u(t)$ at time t by time $\Delta t$ is calculated in the form of a solution to a differential equation. Hereinafter, description will now be made in relation to a procedure of a thermal hydraulic simulation using reduced analysis DOF models.

Also the simulation carried out by the second simulator 26 has the following seven Sub-Steps 1-7 in the same manner as the stable sequential solution described in the item (2-4).

In the simulation by the second simulator 26, the n-dimensional velocity vector u is converted into an m-dimensional velocity vector r (m<n) on the basis of the above Formula (28) using the velocity-field dimension transformation matrix P. In the same manner, the temperature vector T is transformed into a temperature vector s, which is smaller in dimension than the temperature vector T, on the basis of the above Formula (29) using the temperature-field dimension transformation matrix Q. Namely, the second simulator 26 converts the velocity-field analysis mode and the temperature-field analysis into the respective reduced DOF models using the velocity-field dimension transformation matrix P and the temperature-field dimension transformation matrix Q. The simulation carried out on such reduced analysis DOFs model can reduce an amount of calculation because of a reduced number of variables, and can therefore be accomplished greatly faster than the simulation of the analysis models having the DOFs before the reduction (i.e. having the first DOFs).

(Sub-Step1) External Force Term (A):

An intermediate state vector (reduced DOF velocity vector) $r_{step1}$ that represents a state of a velocity field having a reduced analysis DOF is to be obtained.

Specifically, the analysis DOF of Formula (7) related to the external force term (A) calculated stable sequential solution is reduced using the velocity-field dimension transformation matrix P, so that the following Formula (30) is obtained and consequently the intermediate state vector $r_{step1}$ is obtained.

$$r_{step1} = P^T u_0 - \Delta t (T - T_r) \alpha P^T g \quad (30)$$

(Sub-Step2) Advection Term (B)

Using the internal state vector $r_{step1}$ obtained in Sub-Step 1, an intermediate state vector $r_{step2}$ that represents a state of a velocity field having a reduced analysis DOF is to be obtained.

The following Equation (31) related to the advection term is discretized and establishes the relationship $A_u = -(u \cdot \nabla)$. Under this state, the DOFs of the both sides of Equation (31) are reduced and thereby a time evolution equation of a state vector r is derived. Consequently the following Formula (32) is obtained.

$$\dot{u} = -(u \cdot \nabla) u \quad (31)$$

$$\dot{r} = (r^1 P^T A_{b_1} P + \ldots + r^m P^T A_{b_m} P) r = A_r r \quad (32)$$

Expressing the initial state vector by $r_{step1}$, the above ordinary differential equation (32) is calculated to obtain the general solution, and consequently the following Formula (33) is obtained, so that an intermediate state vector $r_{step2}$ is calculated. In this Formula (33), $E_A$ represents the eigenvector of $A_r$, and $\Lambda_A$ represents a diagonal matrix having the eigenvalue of $A_r$ as the elements in the principal diagonal. The relationship $A_r = E_A \Lambda_A E_A^{-1}$ is established.

$$r_{step2} = e^{\Delta t A_r} r_{step1} = E_A e^{\Delta t \Lambda_A E_A^{-1}} r_{step1} \quad (33)$$

(Sub-Step 3) Diffusion Term (C):

Using the intermediate state vector $r_{step2}$ obtained in Sub-Step 2, an intermediate state vector $r_{step3}$ that represents a state of a velocity field having a reduced analysis DOF is to be calculated.

The analysis DOF of Formula (11) related to the diffusion term (C) of the stable sequential solution is reduced using the velocity-field dimension transformation matrix P, and thereby the following Formula (34) is obtained.

$$\dot{r} = P^T(-\nu \nabla^2) Pr = P^T D Pr \quad (34)$$

Expressing the initial state vector by $r_{step2}$, the above ordinary differential equation (34) is calculated to obtain the general solution, and consequently the following Formula (33) is obtained, so that an intermediate state vector $r_{step3}$ is calculated. In this Formula (35), $E_D$ represents the eigenvector of D, and $\Lambda_D$ a diagonal matrix having the eigenvalue of D as the elements in the principal diagonal. The relationship $D = E_D \Lambda_D E_D^{-1}$ is established.

$$r_{step3} = e^{\Delta t D} r_{step2} = E_D e^{\Delta t \Lambda_D E_D^{-1}} r_{step2} \quad (35)$$

(Sub-Step 4) Pressure Term (D):

The column vectors of the velocity-field dimension transformation matrix $P = [b^1, b^2, \ldots, b^m]$ is obtained from samples in which the pressure term (D) is reflected and therefore already considers the influence of the pressure term (D). Therefore, the entire velocity field expressed by linear combination of the base vectors $b^i$ already considers the influence by the pressure term (D), so that there is no need to calculate the pressure term (D) again here.

(Sub-Step 5) Generation Term (E):

An intermediate state vector $r_{step5}$ that represents a state of a temperature field having a reduced analysis DOF is to be calculated. The analysis DOF of Formula (19) related to the generation term (E) obtained by the stable sequential solution is reduced using the temperature-field dimension transformation matrix Q, and thereby the following Formula (36) is obtained, which calculates an intermediate state vector $s_{step5}$.

$$s_{step5} = Q^T T_0 - \Delta t Q^T S \quad (36)$$

(Sub-Step 6) Thermal Advection Term (F):

Using the intermediate state vector $s_{step5}$ obtained in Sub-Step 5, an intermediate state vector $s_{step6}$ that represents a state of a temperature field having a reduced analysis DOF is to be calculated.

The following Equation (37) related to the thermal advection term is discretized and in the relationship $A_u = -(u \cdot \nabla)$ is established. Similarly to Sub-Step 2 described in item (2-6), expressing the initial state vector by $s_{step5}$, the following Formula (38) is obtained and the intermediate state vector $s_{step6}$ is calculated. In this Formula (38), $E_A$ represents the eigenvector of $A_r$, and $\Lambda_A$ represents a diagonal matrix having the eigenvalue of $A_r$ as the elements in the principal diagonal. The relationship $A_r = E_A \Lambda_A E_A^{-1}$ is established.

$$\dot{T} = -(u \cdot \nabla) T \quad (37)$$

$$s_{step6} = e^{\Delta t A_r} s_{step5} = E_A e^{\Delta t \Lambda_A E_A^{-1}} s_{step5} \quad (38)$$

(Sub-Step 7) Thermal Diffusion Term (G):

Using the intermediate state vector $s_{step6}$ obtained in Sub-Step 6, an intermediate state vector $s_{step7}$ that represents a state of a temperature field having a reduced analysis DOF is to be obtained.

The analysis DOF of Formula (21) related to the thermal diffusion term (G) of the stable sequential solution is reduced using temperature-field dimension transformation matrix Q, and thereby the following Formula (39) is obtained.

$$\dot{s} = Q^T(-\kappa \nabla^2) Qs = Q^T D_T Qs \quad (39)$$

Expressing the initial state vector by $s_{step6}$, the above ordinary differential equation (34) is calculated to obtain the general solution, and consequently the following Formula (40) is obtained, so that an intermediate state vector $s_{step7}$ is calculated. In this Formula 40, $E_{DT}$ represents the eigenvector of $D_T$, and $\Lambda_{DT}$ a diagonal matrix having the eigenvalue of $D_T$ as the elements in the principal diagonal. The relationship $D_T = E_{DT} \Lambda_{DT} E_{DT}^{-1}$ is established.

$$s_{step7} = e^{\Delta t D_T} s_{step6} = E_{DT} e^{\Delta t \Lambda_{DT} E_{DT}^{-1}} s_{step6} \quad (40)$$

The intermediate state vector $r_{step4}$ of the velocity field having a reduced analysis DOF and the intermediate state vector $s_{step7}$ of the temperature field having a reduced analysis DOF obtained in the above manner are regarded as the velocity field and the temperature field at time after the time $\Delta t$ from a certain time t.

(2-7) Displaying of the Result of the Simulation

The result of the thermal hydraulic simulation carried out by the second simulator 26 is stored in the memory region 34 of the memory 30, and is displayed on the monitor 40 under the control of the display controller 22 as depicted in, for example, FIGS. 5-9, which are first to fifth examples of displaying the simulation results by the thermal hydraulic simulating device 1.

Figure 5:
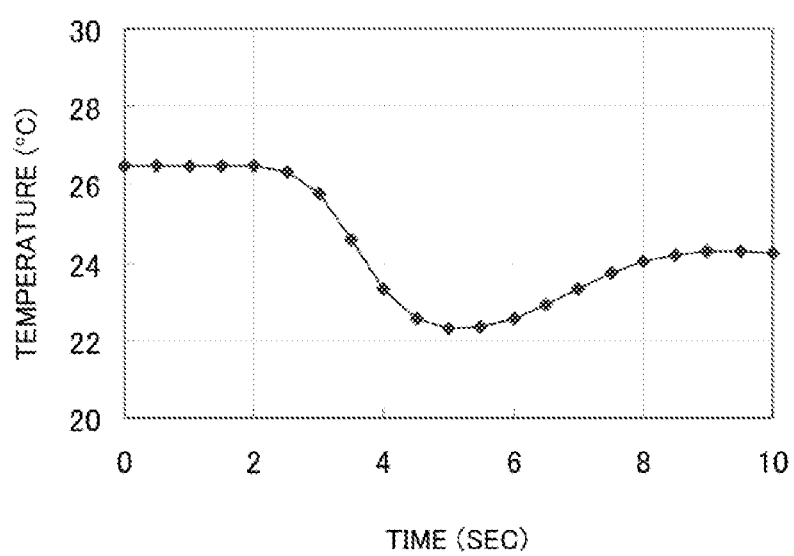
FIG. 5 is a diagram illustrating a first example (line graph) of displaying a result of a simulation carried out a thermal hydraulic simulating device of the first embodiment.
Figure 7:
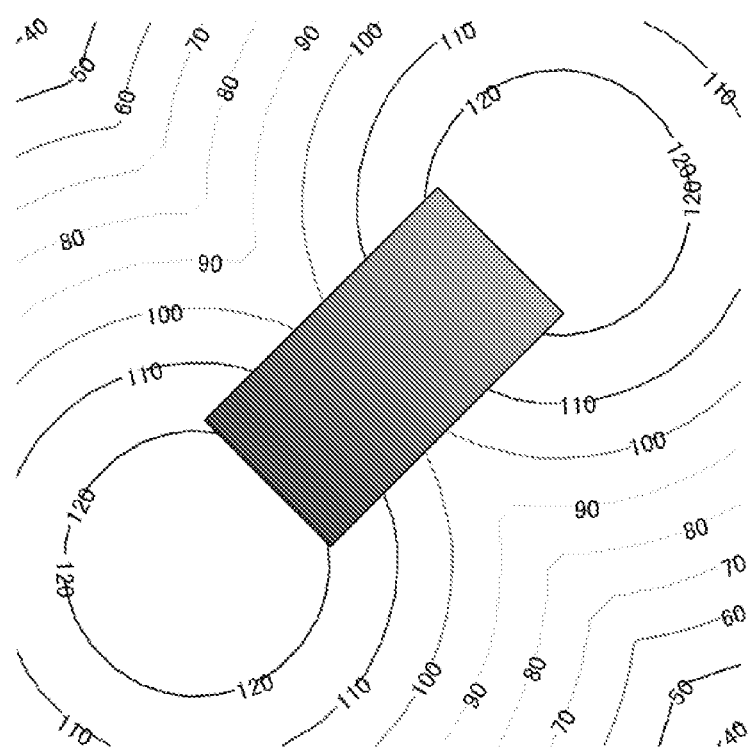
FIG. 7 is a diagram illustrating a third example (contour diagram) of displaying a result of a simulation carried out a thermal hydraulic simulating device of the first embodiment.
Figure 8:
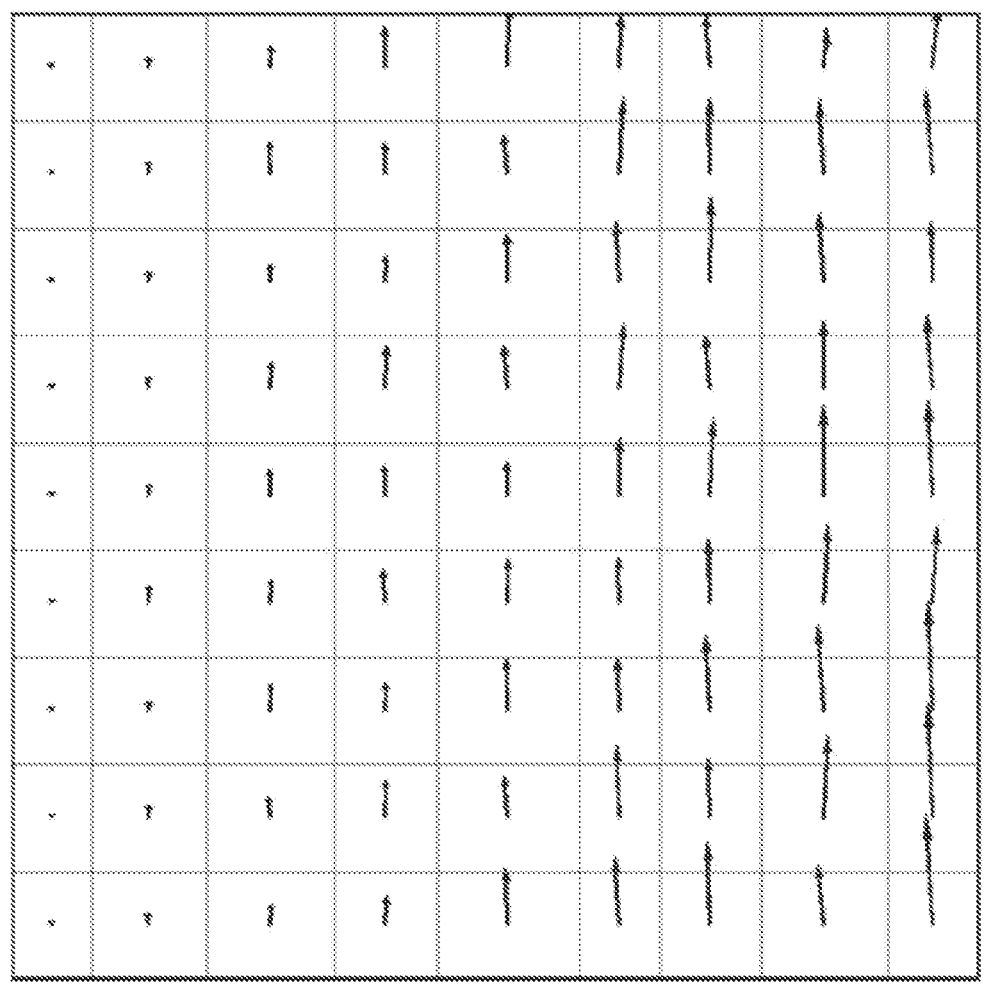
FIG. 8 is a diagram illustrating a fourth example (vector distribution diagram) of displaying a result of a simulation carried out a thermal hydraulic simulating device of the first embodiment.
Figure 9:
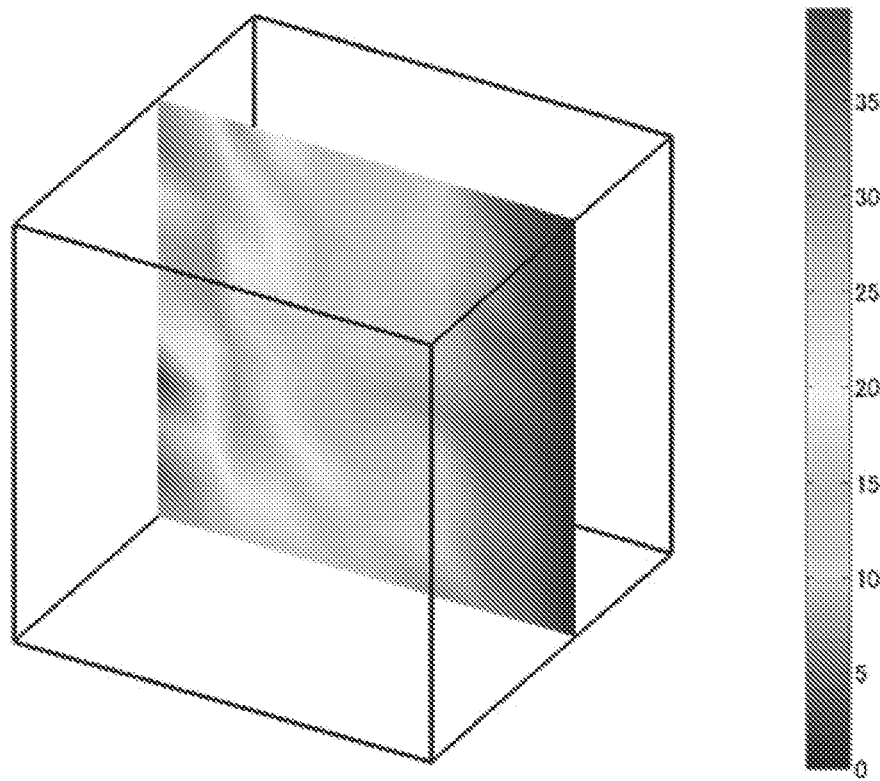
FIG. 9 is a diagram illustrating a fifth example (color map) of displaying a result of a simulation carried out a thermal hydraulic simulating device of the first embodiment.

The first example of FIG. 5 displays a result of the thermal hydraulic simulation by a line graph; the second example of FIG. 6 displays a result of the thermal hydraulic simulation by a table containing numeric data; the third example of FIG. 7 displays a result of the thermal hydraulic simulation by a contour diagram; the fourth example of FIG. 8 displays a result of the thermal hydraulic simulation by a vector distribution diagram; and the fifth example of FIG. 9 displays a result of the thermal hydraulic simulation by a color map on a plane. However, FIG. 9 displays the simulation result in a gray scale. Besides the above, a result of the thermal hydraulic simulation may displayed by particulate. Alternatively to being visually displayed on the monitor 40, a result of the thermal hydraulic simulation carried out by the second simulator 26 may be output in the form of being printed on paper by a non-illustrated printer.

(3) Effect of the Thermal Hydraulic Simulating Device of the First Embodiment

In the thermal hydraulic simulating device 1 of the first embodiment, the first simulator 23 carries out the prior simulations of the velocity field and the temperature field through the stable sequential solution, so that the intervals of time step can be set to be large. This can enhance the speed of the prior thermal hydraulic simulation.

In addition, the model analyzing unit 25 carries out principal component analysis on the snapshot data of the velocity field and the temperature field collected during the prior simulation by the snapshot collecting unit 24 and thereby calculates a velocity-field dimension transformation matrix and a temperature-field dimension transformation matrix.

The second simulator 26 carries out a simulation of the velocity field and the temperature field having reduced analysis DOFs using the velocity-field dimension transformation matrix and the temperature-field dimension transformation matrix calculated.

Namely, the DOFs of the analysis models are reduced using the velocity-field dimension transformation matrix and the temperature-field dimension transformation matrix obtained on the basis of the prior simulations of the velocity field and the temperature field, and then the thermal hydraulic simulation is carried out on the reduced analysis DOF models having the reduced analysis DOFs.

The simulation carried out on such reduced analysis DOF models can reduce an amount of calculation because of a reduced number of variables, and can therefore be accomplished greatly faster than the simulation of the analysis models having the DOFs before the reduction (i.e. having the first DOFs).

As the above, in the thermal hydraulic simulating device 1, the first simulator 23 carries out the prior thermal hydraulic simulation at a high speed and the second simulator 26 carries out a high-speed thermal hydraulic simulation on analysis models having reduced analysis DOFs, which makes it possible to rapidly grasp the heat distribution and the fluid flow from the thermal hydraulic simulation. Consequently, thermal design when a product such as a server is developed or a structure such as a data center is constructed can be accomplished highly efficiently.

The snapshot collecting unit 24 of the first embodiment exhaustively collects snapshots of the velocity field and the temperature field being in various states. Since the velocity field fluctuates faster than the temperature field, the snapshot collecting unit 24 collects the snapshot data of the velocity field at intervals shorter than that of collecting the snapshot data of the temperature field. Thereby, the snapshots of the velocity field and those of the temperature field in which various states are reflected can be surly collected.

(4) Function for Varying Analysis Condition Including a Boundary Condition

If a boundary condition or another condition, included the analysis condition, is frequently modified during the simulation by the second simulator 26, the current state is frequently referred to. Namely, a boundary condition of the position (real-dimension position) designated in a real-dimension space is modified, the state of the position before the modification is normally referred to. For the above, the state of the simulation performed on the reduced analysis DOF space by the second simulator 26 is converted from the reduced analysis DOF space to the real dimension space and the real-dimension position is referred to. After that, a desired setting value considering the referred state is added to the real-dimension position in the real dimension space, and the state after the addition is converted into the real dimension space into the reduced analysis DOF state. Thereby, the modification in the boundary condition is reflected in the simulation that the second simulator 26 carries out on the reduced analysis DOF space. However, the modification in the analysis condition including the boundary condition and other condition involves, as the above, frequent conversions between a reduced analysis DOF space and the real dimension space, which consequently takes a long time.

As a solution, in the physical simulation of the present invention that solves the above time-evolution equations in a reduced analysis DOF space, reference to and modification in a boundary condition of the real dimension that are carried out in the reduced analysis DOF space can omit the above dimension conversions. Consequently, even if a boundary condition is frequently modified during the simulation on a reduced analysis DOF space, the processing related to the modification can be rapidly accomplished.

(4-1) Configuration and Function of Modifying an Analysis Condition in the Thermal Hydraulic Simulating Device of the First Embodiment:

Hereinafter, description will now be made in relation to the configuration and the function of reference to and modification in a boundary condition made for the real dimension in a reduced analysis DOF space with reference to FIGS. 1 and 2. The configuration and the function of reference to and modification in a boundary condition made in the real dimension in a reduced analysis DOF space are realized by the input operating unit 10, the inputting unit 21, the model analyzing unit 25, and the second simulator 26.

As described above, the inputting unit 21 receives, before the simulation starts, calculation condition data that is to be used for the thermal hydraulic simulation and that is input by the user via the input operating unit 10 by means of the GUI function, and stores the received pieces of information in the memory 30.

Here, the calculation condition data input from the inputting unit 21 includes, in addition to the above calculating condition, data related to an analysis condition (boundary condition) that can be modified during the second simulation by the second simulator 26.

When a boundary condition is modified while the second simulator 26 is carrying out the simulation on a reduced analysis DOF space, the position whose boundary condition is to be modified is designated to the real-dimension position in the real dimension space before the simulation is carried out. The information about the real-dimension position is input, being regarded as one piece of the calculation condition data, via the input operating unit 10 and the inputting unit 21, and then is stored in the memory region 31 (see arrows a1 and a2 in FIG. 2).

As detailed above, the model analyzing unit 25 calculates a velocity-field dimension transformation matrix (see above Formulae (27) and (28)) and a temperature-field dimension transformation matrix (see above Formula (29)), and stores the calculated matrixes, being regarded as reduced analysis DOF data, in the memory region 33 (see arrow a7 in FIG. 2). In addition, if the analysis condition at the real-dimension position previously designated in the real dimension space it to be during the simulation on a reduced analysis DOF space by the second simulator 26, that is, if the real dimension space at which the boundary condition is to be modified is stored in the memory region 31, the model analyzing unit 25 executes the following function.

Specifically, before the second simulator 26 starts the simulation, the model analyzing unit 25 calculates the following operators on the basis of the real dimension position of the memory region 31 (see arrow a12 in FIG. 2) and the calculated velocity-field or temperature field dimension transformation matrix. The operators here accomplish the process (i.e., modification processing) related to modification in boundary condition at the real dimension position designated beforehand in a reduced analysis DOF space. The operators include following referring operator, adding operator (boundary condition adding operator), and clearing operator (zero clearing operator). The calculated operators are stored, being considered as the reduced analysis DOF data, along the velocity-field dimension transformation matrix and the temperature-field dimension transformation matrix in the memory region 33 (see arrow a7 in FIG. 2).

A referring operator obtains and refers to, in a reduced analysis space, the state (e.g., velocity, temperature, or a differential value of velocity or temperature) of a real dimension position designated beforehand and is detailed in the item (4-3-1) below.

A boundary condition adding operator carries out modification processing, in which a desired setting value (boundary condition) is added to (or subtracted from) the real dimension position, in a reduced analysis DOF space, and is detailed in the item (4-3-2) below. A desired setting value here may be a constant value previously determined by the user or the like, and may be determined on the basis of the state referred to and obtained by the referring operator, in other words, may be obtained from a function using the state as an argument. If a desired setting value is a constant value, the constant value may be set before the simulation starts or may be set by the use or the scenario in the event of modification in the boundary condition. In contrast, if a desired setting value is obtained from a function, the function is determined before the simulation starts and the setting value is determined by the function in the event of modification in the boundary condition.

A zero clearing operator clears, in the reduced analysis DOF space, a state (boundary condition) of the real dimension position designated beforehand, and is detailed in the item (4-3-3) below.

As the above, the second simulator 26 carries out the simulation of the velocity field and the temperature field having respective reduced analysis DOFs on the basis of the calculation condition stored in the memory region 31 (see arrow a9 in FIG. 2) using the velocity-field dimension transformation matrix and the temperature-field dimension transformation matrix stored in the memory region 33 (see arrow a8 in FIG. 2). During the simulation, the second simulator 26 carries out a process related to modifying the boundary condition in the reduced analysis DOF space using the above operators (see arrow a8 in FIG. 2) in response to obeying the modification instruction received from an external entity or described in a predetermines scenario. The modification instruction form an external entity is, for example, a modification instruction that the user inputs via the input operating unit 10. For example, the predetermined scenario is stored, as the calculation condition data, in the memory region 31 by the user before the simulation starts.

The second simulator 26 refers to the state (boundary condition) of the real dimension position, designated beforehand, in the reduced analysis DOF space using the referring operator and then adds the setting value (function value) in which the referred state is considered, to the real dimension in the real dimension position by using the boundary condition adding operator. Thereby, the boundary condition can be modified in the reduced analysis DOF space. Furthermore, the second simulator 26 can add the predetermined setting value to the real dimension position in a reduced analysis DOF space by using the boundary condition adding operator. Such modification processing using the referring operator and the boundary condition adding operator can be employed when, for example, the speed of an accelerator fan or a non-linear fan is to be modified, the resistance (i.e., external force) is to be modified, or the temperature of a heating element is to be modified in the real dimension position designated beforehand.

The second simulator 26 clears the state of the real dimension position designated beforehand to zero in the reduced analysis DOF space using the zero clearing operator and then adds the setting value to the real dimension position in the reduced analysis DOF space using the boundary condition adding operator. Thereby, the processing of rewriting the state of the real dimension position to the setting value can be accomplished in a reduced analysis DOF space. For example, such modification processing using the zero clearing operator and the boundary condition adding operator is adopted when modification due to addition another velocity designating fan or when modification due to temperature designation is to be made.

Modification made using the referring operator, the boundary condition adding operator, and the zero clearing operator may be determined by the modification instruction from the external entity or may be described in the predetermined scenario.

As described above, the result of simulation including the modification processing in the boundary condition by the second simulator 26 is stored in the memory region 34 (see arrow a10 in FIG. 2). The simulation result stored in the memory region 34 is displayed on the monitor 40 under the control of the display controller 22 (see arrow a11 in FIG. 2), but may alternatively be printed out on paper by a printer (not illustrated).

(4-2) Operation Accompanying Modification Processing in Analysis Condition (Boundary Condition) in the Thermal Hydraulic Simulating Device of this Embodiment:

Next, description will now be made in relation to the operation of the thermal hydraulic simulating device 1 having the following function of modifying the analysis condition (boundary condition) with reference to FIGS. 10 and 11.

(4-2-1) Outline of Operation of Modifying the Analysis Condition (Boundary Condition):

The entire snapshot data used in the principal component analysis by the thermal hydraulic simulating device 1 (the model analyzing unit 25) when the dimension transformation matrixes are calculated satisfies the boundary condition which is not changing during the simulation and includes free sliding conditions and input/output conditions of the wall and ambient obstacles. For this reason, the bases generated from the snapshot data and the velocity field and temperature field expressed by overlaying the bases naturally satisfy the boundary condition.

In addition to the not-changing boundary conditions, some boundary conditions are referred to and modified during execution of the simulation. Such variable boundary conditions are designating external force (resistance) effective to a particular position and designating velocity and/or temperature of a particular position. Modification in such a variable boundary condition involves re-calculation the projection from the real dimension space (n dimensional space) to a reduced analysis DOF space (m dimensional space, here m<n). As detailed above, the calculation of projection to the lower dimensional space is a calculation in the real dimension space, which has a possibility of causing delay in analysis. For the above, the thermal hydraulic simulating device 1 of the first embodiment calculates the above referring operator, the boundary condition adding operator, and a zero clearing operator before the second simulator 26 starts the simulation, so that the boundary condition can be modified in a lower-dimension reduced analysis DOF space.

(4-2-2) Flow of Processing Accompanying Modification Processing in Analysis Condition (Boundary Condition) in the Thermal Hydraulic Simulating Device:

Next, description will now be made in relation to a succession of procedural steps carried out in the thermal hydraulic simulating device 1 having a function of modifying the analysis condition (boundary condition) with reference to the flow diagram FIG. 10 (steps S11', S12-S18, S181, S19', and S20-S22).

Figure 10:
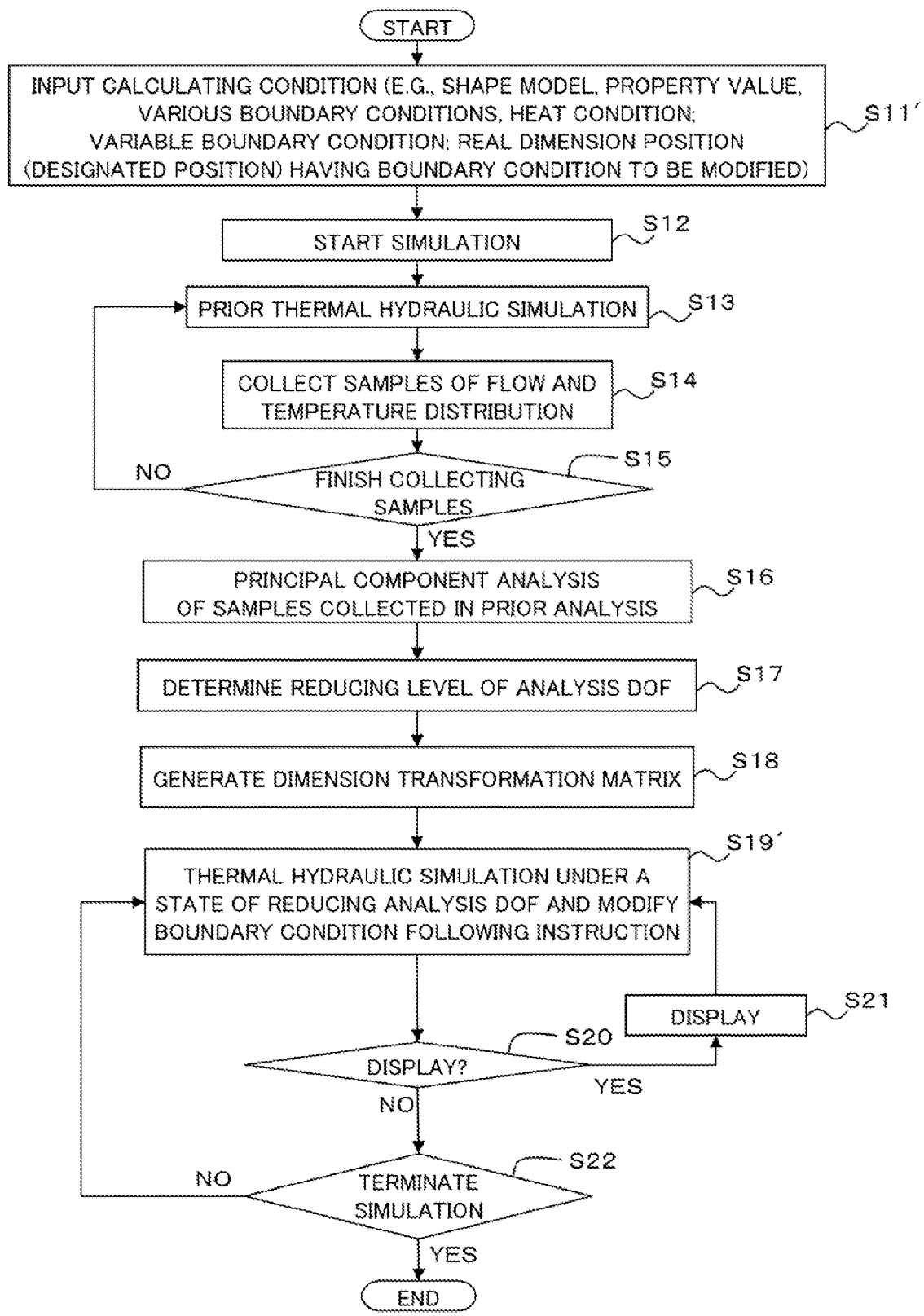
FIG. 10 is a diagram illustrating a flow of processing in a thermal hydraulic simulating device having a function of modifying an analysis condition (boundary condition) of the first embodiment.

Here, the flow of processing of FIG. 10 is basically identical to steps S11-S22 illustrated in FIG. 3. However, the processing of FIG. 10 has steps S11' and S19' respectively substituted for steps S11 and S19 of the flow diagram of FIG. 3 and additionally includes step S181 between the steps S18 and S19' differently from that of FIG. 3. Here, processing of steps S12-S18, and S20-S22 is omitted, but steps s11', S181, and S19' will now be detailed.

In step S11', the inputting unit 21 receives, before the simulation starts, various pieces of data that are to be used for the thermal hydraulic simulation, that is the calculating condition data here, and that are input from the user via the input operating unit 10, and stores the received pieces of data into the memory region 31 of the memory 30, similarly to the step S11 of FIG. 3. However, it should be noted that the calculation condition data treated in step S11' includes the calculation condition data and data related to an analysis condition (boundary condition) that can be modified during the simulation by the second simulator 26. In particular, the second simulator 26 modifies the boundary condition during simulation on a reduced analysis DOF space, the data related to the real dimension position (designated position) whose boundary condition is to be modified is stored, as one pieces of the calculation condition data, in the memory region 31.

After the model analyzing unit 25 calculates the velocity-field dimension transformation matrix and the temperature-field dimension transformation matrix and stores the matrixes, as reduced analysis DOF data, in the memory region 33 in step S18, the model analyzing unit 25 calculates the above operators and stores the operators, as reduced analysis DOF data, in the memory region 33 at ensuing step S181. For the step S181, the model analyzing unit 25 calculates one or more of the referring operator, the boundary condition adding operator, and a zero clearing operator that are to be used in modification processing that the user desires on the basis of the real dimension position stored in the memory region 31 and the velocity-field dimension transformation matrix or the temperature-field dimension transformation matrix also stored in the memory region 31. The specific manner of calculating a referring operator will be described in the item (4-3-1) below; that of a boundary condition adding operator will be described in the item (4-3-2) below; and that of a zero clearing operator will be described in the item (4-3-3) below.

Upon the dimension transformation matrixes and the operators are calculated, the second simulator 26 carries out, similarly to step S19 of FIG. 3, the thermal hydraulic simulation under a state of reducing the analysis DOFs, that is, on a reduced analysis DOF space, using the velocity-field dimension transformation matrix and the temperature-field dimension transformation matrix stored in the memory region 33 in step S19'. However, in step S19', the second simulator 26 carries out processing related to modification in the boundary condition in the reduced analysis DOF space during the simulation in response to the modification instruction from an external entity or described in a predetermine scenario. After that, the second simulator carries out the thermal hydraulic simulation on the reduced analysis DOF space under the modified boundary condition.

At that time, if the second simulator adds 26 (or subtracts) a setting value corresponding to the state (boundary condition) of the real dimension position designated beforehand to (or from) the real dimension position in a reduced analysis DOF space, the referring operator and the boundary condition adding operator are used, so that the modification processing in the boundary condition is carried out in the reduced analysis DOF space. Namely, the second simulator 26 refers to the state (boundary condition) of the real dimension position in a reduced analysis DOF space using the referring operator, and adds the setting value (function value) considering the referred state, to the real dimension position in the reduce analysis DOF space using the boundary condition adding operator.

If the second simulator 26 carries out the modification processing of adding (or subtracting) a predetermined setting value to (or from) the real dimension position designated beforehand, the boundary condition adding operator is used, so that the modification processing in the boundary condition is carried out in the reduced analysis DOF space. In other words, the second simulator 26 adds the predetermined setting value to the real dimension position in the reduced analysis DOF space using the boundary condition adding operator.

If the second simulator 26 carries out the processing of rewriting the state of the real dimension position designated beforehand to the setting value, the zero clearing operator and the boundary condition adding operator are used, so that the modification processing in the boundary condition is carried out in the reduced analysis DOF space. Specifically, the second simulator 26 clears the state of the real dimension position designated beforehand to zero using the zero clearing operator and then adds the setting value to the real dimension position in the reduced analysis DOF space using the boundary condition adding operator.

(4-3) Operators and Manner of Calculating the Operators:

Next, description will now be made in relation to three operators calculated by the model analyzing unit 25 of the thermal hydraulic simulating device 1 of the first embodiment and detailed manners of calculating the respective operators.

(4-3-1) Referring Operator:

The referring operator obtains and refers to the state (e.g., velocity, temperature, and/or a differential value of velocity or temperature) of a real dimension position, designated beforehand in the real dimension space, in a reduced analysis space, and is defined and calculated as follows.

Figure 11:
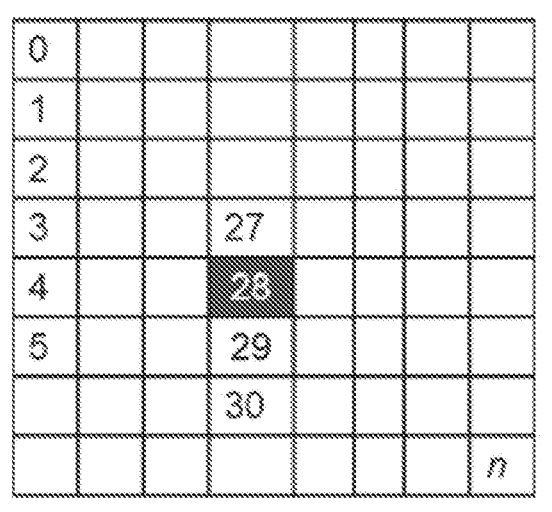

Here, two-dimensional grid illustrated in FIG. 11 is to be considered. The description assumes that position (real dimension position) of the 28-th cell is designated beforehand and the referring operator obtains the x-component $ux_{28}$ of the velocity at this position. FIG. 11 illustrates positions of cells to be referred to in a real dimension space for explaining the referring operator of the first embodiment.

Here, assuming that an i-th (i=0 through n) cell has a velocity expressed by $[ux_i, uy_i]$, a column vector (velocity vector)-all in which velocities of all the cells are arranged is considered (see following Formula (41)). The velocity $ux_{28}$ desired to be referred to is the 57-th elements among the total $2(n+1)$ elements in the column vector $u_{all}$.

$$u_{all} = \begin{bmatrix} ux_0 \\ uy_0 \\ ux_1 \\ \vdots \\ ux_{28} \\ uy_{28} \\ ux_{29} \\ uy_{29} \\ \vdots \\ \vdots \\ ux_n \\ uy_n \end{bmatrix} \quad (41)$$

Here, a column vector $I_i$ having the i-th element being 1 and the remaining elements being 0 is considered and the following Formula (42) is obtained under the condition of i=57.

$$I_{57}u_{all} = \begin{bmatrix} 0 \\ 0 \\ 0 \\ \vdots \\ ux_{28} \\ 0 \\ 0 \\ 0 \\ \vdots \\ 0 \\ 0 \end{bmatrix} \quad (42)$$

Expressing a velocity vector $u_{all}$ in a reduced analysis DOF space by $r_{all}$ and a referring operator that obtains, in the reduced analysis DOF space, the state $I_{57}u_{all}$ representing a state of the designated real dimension position $I_{57}$ by $C_r$, application of the above Formulae (27) and (28) obtains the following Formula (43), on the basis of which the referring operator $C_r$ is defined by the following Formula (44). Namely, on the basis of the real dimension position $I_i$ designated beforehand, the velocity-field dimension transformation matrix P, and $P^T$ (the inverse matrix of P, the referring operator $C_r$ is calculated.

$$P^T I_{57} u_{all} = P^T I_{57} P r_{all} = C_r r_{all} \quad (43)$$

$$C_r = P^T I_{57} P \quad (44)$$

The model analyzing unit 25 calculates the referring operator $C_r$ and the second simulator 26 multiplies the vector expressing $r_{all}$ in the reduced analysis DOF space at any time point during the simulation and the referring operator $C_r$, so that the state of the reduced analysis DOF space corresponding to the velocity at the real dimension position Ii at that time is obtained from the calculation, $C_r r_{all} = P^T I_i P r_{all}$.

Here, description is made in relation to the referring operator $C_r$ related to the velocity column vector $u_{all}$. Also for the temperature column vector s, a similar referring operator $C_r$ is defined from the following Formula (45) based on the real dimension position $I_i$ designated beforehand, the temperature-field dimension transformation matrix Q, and $Q^T$.

$$C_r = Q^T I_i Q \quad (45)$$

A differential value can be also obtained by setting the coefficients of the referring operator $C_r$. Here, a referring operator $C_r$ that refers to an amount of variation (differential value, the following Formula (46)) of the x-direction velocity of, for example, the 28-th cell (real dimension position) is to be considered.

$$\frac{\partial ux_{28}}{ux} = \frac{ux_{29} - ux_{27}}{\Delta x} \quad (46)$$

Here, the velocities $ux_{27}$ and $ux_{29}$ to be used for calculation of an amount of variation are the 55-th and 59-th elements among all the 2(n+1) elements of the velocity vector $u_{all}$. On the basis of a 2(n+1)×2(n+1) matrix X having the value at the 57-th row and 55-th column being $-1/\Delta x$, the value at the 57-th row and 59-th column being $+1/\Delta x$, and the values of the remaining elements are all zero, the following Formula (47) is obtained. Here, $\Delta x$ represents an x-direction distance of cells.

$$Xu_{all} = \begin{bmatrix} 0 \\ 0 \\ \vdots \\ 0 \\ 0 \\ \dfrac{I_{59}u_{all} - I_{55}u_{all}}{\Delta x} \\ 0 \\ 0 \\ 0 \\ \vdots \\ 0 \\ 0 \end{bmatrix} \quad (47)$$

Application above Formulae (27) and (28) to above Formula (47) obtains following Formula (48), on the basis of which following Formula (49) defines a referring operator $C_r$. Namely, a referring operator Cr is calculated on the basis of a matrix X defined by the real dimension position designated beforehand, a velocity-field dimension transformation matrix P, and $P^T$. Accordingly, use of the referring operator Cr expressed as the following Formula (49) makes it possible to refer to, in the reduced analysis DOF space, the differential value of the real dimension space. Here, description is made in relation to a referring operator $C_r$ related to the differential value of a velocity. A referring operator $C_r$ that refers to the differential value of a temperature is defined as $C_r = Q^T X Q$ in the same manner as the Formula (49).

$$P^T X u_{all} = P^T X P r_{all} = C_r r_{all} \quad (48)$$

$$C_r = P^T X P \quad (49)$$

(4-3-2) Boundary Condition Adding Operator:

As described above, a boundary condition adding operator carries out a modification processing that adds (or subtracts) a desired setting value (boundary condition) to (or from) the real dimension position in the reduced analysis DOF space and is defined and calculated as follows. Then, use of the calculated boundary condition adding operator reflects the modification to the boundary condition in the reduced analysis DOF space.

Hereinafter, description will now be made in relation to processing (modification processing in the boundary condition) that adds a designated value (setting value), serving as an external force, to the velocity at a designated position (real dimension position).

Here, the external force vector $f=[f_1, \ldots, f_n]^T$ can be expressed by the following Formula (50).

$$f = \sum_{i=1}^{n} f_i I_i = \sum_{i \in X} f_i I_i \quad (50)$$

In the above Formula (50), $f_i$ represents a scalar value of an external force effects on the variable of the i-th element of the external force vector f, and X represents a set of element numbers having scalar values $f_i$ not being zero. Reduction of the dimension of the above Formula (50) using the velocity-field dimension transformation matrix P express an external force vector $f_r$ in a lower dimension space, i.e., in the reduced analysis DOF space, by the following Formula (51). In Formula (51), $C_r^i$ represents the referring operator of the element i.

$$fr = \sum_{i \in X} (f_i P^T I_i) = \sum_{i \in X} (f_i C_r^i) \quad (51)$$

Processing of adding a desired external force, as the setting value, to a setting position of the boundary condition of the real dimension space in the reduced analysis DOF space can be accomplished by previously calculating the referring operator $C_r^i = P^T I_i$ beforehand. Here, the operator of the following Formula (52) is defined as the boundary condition adding operator $C_a$ and is calculated.

$$C_a(f) = fr = \sum_{i \in X} (f_i C_r^i) \quad (52)$$

In modifying the boundary condition using the above Formula (52), the time width $\Delta t$ of the simulation is assumed to be small enough to obtain the velocity vector r' after the modification from following Formula (53).

$$r' = r + \Delta t C_a(f) \quad (53)$$

Here, description is made in relation to the boundary condition adding operator $C_a$ related to the velocity field, but a boundary condition adding operator $C_a$ related to the temperature field is similarly defined and calculated.

(4-3-3) Zero Clearing Operator:

Next, processing of correcting the velocity or the temperature of a particular position of an n dimensional space (i.e., real dimension space) to values designated in a lower dimension space (i.e., reduced analysis DOF space) will now be considered. In this embodiment, a zero clearing operator that clears the velocity or the temperature only at the setting position of the boundary condition of the real dimension space to zero in a low dimension space is defined. A combination of a zero clearing operator and the above boundary condition adding operator rewrites the velocity and the temperature at the designated position to a correct value.

Here, a matrix M defined by the following Formulae (54) and (55) is to be first considered.

$$M = E - [J_0, \ldots, J_n] \quad (54)$$

$$J_i = \begin{cases} \text{if } i \in X, & I_i \\ \text{if } i \notin X, & I_c \end{cases} \quad (55)$$

Here, X represents a set of the number of the elements for which a boundary condition is to be set, E represents a unit matrix, $I_c$ is a column vector having n+1 elements all of which is zero.

Using the matrix M in the following Formula (56), a vector u representing a sates can be correctly converted into a state vector u' representing a state of clearing the velocity and the temperature at the position (designated position) at which the boundary condition is to be modified in the real dimension space to zero.

$$u' = Mu \quad (56)$$

Reduction of the dimension of the above Formula (56) using the velocity-field dimension transformation matrix P expresses the state vector r' in the low dimension space, that is, the reduced analysis DOF space, corresponding to the sate vector u' if the real dimension position by the following Formula (57). Here, a matrix Z is defined as a zero clearing operator and is calculated. Namely, on the basis of the matrix M determined on the basis of the designated position $I_i$, the velocity-field dimension transformation matrix P, and $P^T$, the zero clearing operator $Z = P^T MP$ is calculated.

$$r' = Zr = P^T MPr \quad (57)$$

Processing using the zero clearing operator Z and the boundary condition adding operator $C_a$ in combination with each other corrects the velocity and/or the temperature at the designated position in the real dimension space to designated values by the following Formula (58).

$$r' = Zr + \Delta t C_a(f) \quad (58)$$

Here, description is made in relation to a zero clearing operator Z related to the velocity field, but a zero clearing operator Z related to the temperature field is similarly defined and calculated.

(4-4) Effects of the Modification Function of Boundary Condition:

The above referring operator $C_r$, boundary condition adding operator $C_s$, and zero clearing operator Z can be calculated before the second simulator 26 carries out the simulation on the reduced analysis DOF space. Use of these operators can correct the boundary condition during the simulation of the second simulator 26 without returning a state expressed in the reduced analysis DOF space to a state of the real dimension space.

Accordingly, when the boundary condition is modified during the simulation performed by the second simulator 26, there is no need to carry out dimension transformation from the reduced analysis DOF space to the real dimension space and from the real dimension space to the reduced analysis DOF space. Thereby, even if analysis condition, such as the boundary condition, is frequently modified, the modification processing of the boundary condition does not increase the entire processing time, so that the simulation can be efficiently carried out.

(5) Others

A preferred embodiment of the present invention is detailed as the above. However, the present invention is by no means limited to the first embodiment and may be variously modified without departing the gist of the present invention.

The entire function or a part of the function of the inputting unit 21, the display controller 22, the prior thermal hydraulic simulating unit 23, the snapshot collecting unit 24, the model analyzing unit 25, and the second simulator 26 is realized by a computer (such as a CPU, an information processor, and various terminals) executing one or more predetermined application program (thermal hydraulic simulating program).

The programs may be provided in the form of being stored in a computer-readable recording medium, such as a flexible disk, a CD (e.g., CD-ROM, CD-R, CD-RW), a DVD (e.g., DVD-ROM, DVD-RAM, DVD-R, DVD-RW, DVD+R, DVD+RW), and a Blu-ray disc. In this case, a computer reads the programs from the recording medium and sends the read programs to an internal or external memory to store for use.

Here, a computer is a concept of a combination of hardware and an OS (Operating System), and means hardware which operates under the control of the OS. Otherwise, if an application program operates hardware independently of an OS, the hardware corresponds to the computer. Hardware includes at least a microprocessor such as a CPU and means to read a computer program recorded in a recording medium. The thermal hydraulic simulation program contains a program code that causes the above computer to realize the functions of the inputting unit 21, the display controller 22, the prior thermal hydraulic simulating unit 23, the snapshot collecting unit 24, the model analyzing unit 25, and the second simulator 26. Part of the functions may be realized by the OS, not by the application program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments have been described in detail, it should be understood that the various changes, substitutions, and alterations could be made hereto without departing from the spirit and scope of the invention.

What is claimed is:

1. A non-transitory computer-readable recording medium in which a thermal fluid simulation program that carries out a simulation of a velocity field and a temperature field is stored, the program instructing a computer to execute:
   carrying out a first simulation of the velocity field and the temperature field of fluid flow, using a velocity-field analyzing model and a temperature-field analyzing model having respective first degrees of freedom;
   determining levels of reducing the first degrees of freedom based on a result of the first simulation;
   calculating a velocity-field dimension transformation matrix that reduces the degrees of freedom of the velocity-field analyzing model to second degrees of freedom of the velocity field by the levels of reducing determined;
   calculating, separately from the calculating the velocity-field dimension transformation matrix, a temperature-field dimension transformation matrix that reduces the temperature-field analyzing model to second degrees of freedom of the temperature field by the levels of reducing determined;
   converting the velocity-field analyzing model and the temperature-field analyzing model into reduced degree-of-freedom models having the second degrees of freedom using the velocity-field dimension transformation matrix and the temperature-field dimension transformation matrix calculated; and
   carrying out a second simulation of the velocity field and the temperature field of fluid flow using the reduced degree-of-freedom models,
   wherein the program further instructing the computer to execute:
   if a modification of an analysis condition is performed at a full dimension position previously designated in a full dimension space having the first degrees of freedom during the second simulation in a reduced analysis degree-of-freedom space having the second degrees of freedom under the analysis condition,
   before carrying out the second simulation in the reduced analysis degree-of-freedom space,
   calculating, based on the full dimension position and one of the velocity-field dimension transformation matrix and the temperature-field dimension transformation matrix, an operator that executes, in the reduced analysis degree-of-freedom space, processing related to the modification of the analysis condition at the full dimension position; and
   carrying out the processing related to the modifying of the analysis condition in the reduced analysis degree-of-freedom space using the operator calculated,
   wherein the operator includes:
   an adding operator that adds a setting value to the full dimension position, wherein the processing related to the modification of the analysis condition is carried out by adding the setting value to the full dimension position using the adding operator in the reduced analysis degree-of-freedom space; and
   a clearing operator that clears the state of the full dimension position to zero in the reduced analysis degree-of-freedom space,
   the program further instructs the computer to execute
   clearing the state of the full dimension position to zero using the clearing operator in the reduced analysis degree-of-freedom space, and
   adding the setting value to the full dimension position using the adding operator, wherein the processing related to the modification of the analysis condition is carried out by rewriting the state of the full dimension position to the setting value in the reduced analysis degree-of-freedom space.

2. The non-transitory computer-readable recording medium according to claim 1, the program further instructing the computer to execute:
   collecting snapshot data of the velocity field and the temperature field at respective timings during the first simulation using the velocity-field analyzing model and the temperature-field analyzing model having the first degrees of freedom; and
   determining the levels of reducing the first degrees of freedom through principal component analysis on the snapshot data of the velocity field and the snapshot data of the temperature field collected.

3. The non-transitory computer-readable recording medium according to claim 2, the program further instructing the computer to execute collecting the snapshot data of the velocity field and the temperature field being in various states.

4. The non-transitory computer-readable recording medium according to claim 2, the program further instructing the computer to execute collecting the snapshot data of the velocity field at intervals shorter than that of collecting the snapshot data of the temperature field.

5. The non-transitory computer-readable recording medium according to claim 1, the program further instructing the computer to execute carrying out the first and second simulations of the velocity field and the temperature field using Navier-Stokes equations and thermal advection diffusion equations.

6. The non-transitory computer-readable recording medium according to claim 5, the program further instructing the computer to execute carrying out the first and second simulations of the velocity field and the temperature field through stable sequential solution that sequentially solves the Navier-Stokes equations and the thermal advection diffusion equations by considering respective terms in the Navier-Stokes equations and the thermal advection diffusion equations independently of one another.

7. The non-transitory computer-readable recording medium according to claim 2, the program further instructing the computer to execute determining a number of dimensions of an eigenvector having a cumulative contribution degree, obtained as a result of the principal component analysis on the snapshot data of the velocity field, being at least a predetermined value to be the second degree of freedom of the velocity field, and a number of dimensions of an eigenvector having a cumulative contribution degree, obtained as a result of the principal component analysis on the snapshot data of the temperature field, being at least a predetermined value to be the second degree of freedom of the temperature field.

8. The non-transitory computer-readable recording medium according to claim 1, wherein the operator further includes
a referring operator that obtains a state of the full dimension position in the reduced analysis degree-of-freedom space; and
the setting value is a value based on the state obtained by the referring operator.

9. The non-transitory computer-readable recording medium according to claim 1, the program further instructing the computer to execute carrying out the processing related to the modification of the analysis condition using the operator, following an instruction issued from the external entity or an instruction described in a predetermined scenario.

10. A thermal fluid simulating device that carries out a simulation of a velocity field and a temperature field, comprising:
a first simulator that carries out a first simulation of the velocity field and the temperature field of fluid flow, using a velocity-field analyzing model and a temperature-field analyzing model having respective first degrees of freedom;
an analyzer that determines levels of reducing the first degrees of freedom based on a result of the first simulation carried out by the first simulator, calculates a velocity-field dimension transformation matrix that reduces the degrees of freedom of the velocity-field analyzing model to second degrees of freedom of the velocity field by the levels of reducing determined, and calculates, separately from the calculating the velocity-field dimension transformation matrix, a temperature-field dimension transformation matrix that reduces the temperature-field analyzing model to second degrees of freedom of the temperature field by the levels of reducing determined; and
a second simulator that converts the velocity-field analyzing model and the temperature-field analyzing model into reduced degree-of-freedom models having the second degrees of freedom using the velocity-field dimension transformation matrix and the temperature-field dimension transformation matrix calculated by the analyzer, and carries out a second simulation of the velocity field and the temperature field of fluid flow using the reduced degree-of-freedom models,
wherein, if the second simulator performs a modification of an analysis condition at a full dimension position previously designated in a full dimension space having the first degrees of freedom during the second simulation in a reduced analysis degree-of-freedom space having the second degrees of freedom under the analysis condition,
the analyzer calculates, before the second simulator carries out the second simulation, based on the full dimension position and one of the velocity-field dimension transformation matrix and the temperature-field dimension transformation matrix, an operator that executes, in the reduced analysis degree-of-freedom space, processing related to the modification of the analysis condition at the full dimension position; and the second simulator carries out the processing related to the modification of the analysis condition in the reduced analysis degree-of-freedom space using the operator calculated by the analyzer,
wherein the operator includes:
an adding operator that adds a setting value to the full dimension position, the second simulator carrying out the processing related to the modification by adding the setting value to the full dimension position using the adding operator in the reduced analysis degree-of-freedom space; and
a clearing operator that clears the state of the full dimension position to zero in the reduced analysis degree-of-freedom space, and
the second simulator clears the state of the full dimension position to zero using the clearing operator in the reduced analysis degree-of-freedom space, and rewrites the state of the full dimension position to the setting value in the reduced analysis degree-of-freedom space by adding the setting value to the full dimension position using the adding operator to carry the processing related to the modification of the analysis condition.

11. The thermal fluid simulating device according to claim 10, further comprising a collector that collects snapshot data of the velocity field and the temperature field at respective timings during the first simulation using the velocity-field analyzing model and the temperature-field analyzing model having the first degrees of freedom, wherein
the analyzer determines the levels of reducing the first degrees of freedom through principal component analysis on the snapshot data of the velocity field and the snapshot data of the temperature field collected by the collector.

12. The thermal fluid simulating device according to claim 11, wherein the analyzer determines a number of dimensions of an eigenvector having a cumulative contribution degree, obtained as a result of the principal component analysis on the snapshot data of the velocity field, being at least a predetermined value to be the second degree of freedom of the velocity field, and a number of dimensions of an eigenvector having a cumulative contribution degree, obtained as a result of the principal component analysis on the snapshot data of the temperature field, being at least a predetermined value to be the second degree of freedom of the temperature field.

13. The thermal fluid simulating device according to claim 10, wherein the operator further includes:
a referring operator that obtains a state of the full dimension position in the reduced analysis degree-of-freedom space; and
the setting value is a value based on the state obtained by the referring operator.

14. The thermal fluid simulating device according to claim 10, wherein the second simulator carries out the processing related to the modification of the analysis condition using the operator, following an instruction issued from the external entity or an instruction described in a predetermined scenario.

15. A method of a thermal fluid simulation of a velocity field and a temperature field on a computer, comprising:
on the computer
carrying out a first simulation of the velocity field and the temperature field of fluid flow, using a velocity-field analyzing model and a temperature-field analyzing model having respective first degrees of freedom;
determining levels of reducing the first degrees of freedom based on a result of the first simulation;
calculating a velocity-field dimension transformation matrix that reduces the degrees of freedom of the velocity-field analyzing model to second degrees of freedom of the velocity field by the levels of reducing determined;

calculating, separately from the calculating the velocity-field dimension transformation matrix, a temperature-field dimension transformation matrix that reduces the temperature-field analyzing model to second degrees of freedom of the temperature field by the levels of reducing determined;

converting the velocity-field analyzing model and the temperature-field analyzing model into reduced degree-of-freedom models having the second degrees of freedom using the velocity-field dimension transformation matrix and the temperature-field dimension transformation matrix calculated; and carrying out a second simulation of the velocity field and the temperature field of fluid flow using the reduced degree-of-freedom models, wherein the method further comprising: if a modification of an analysis condition is performed at a full dimension position previously designated in a full dimension space having the first degrees of freedom during the second simulation in a reduced analysis degree-of-freedom space having the second degrees of freedom under the analysis condition, before carrying out the second simulation in the reduced analysis degree-of-freedom space, calculating, based on the full dimension position and one of the velocity-field dimension transformation matrix and the temperature-field dimension transformation matrix, an operator that executes, in the reduced analysis degree-of-freedom space, processing related to the modification of the analysis condition at the full dimension position; and carrying out the processing related to the modifying of the analysis condition in the reduced analysis degree-of-freedom space using the operator calculated, wherein the operator includes:

an adding operator that adds a setting value to the full dimension position, wherein the processing related to the modification of the analysis condition is carried out by adding the setting value to the full dimension position using the adding operator in the reduced analysis degree-of-freedom space; and a clearing operator that clears the state of the full dimension position to zero in the reduced analysis degree-of-freedom space, the method further comprising:

clearing the state of the full dimension position to zero using the clearing operator in the reduced analysis degree-of-freedom space, and adding the setting value to the full dimension position using the adding operator, wherein the processing related to the modification of the analysis condition is carried out by rewriting the state of the full dimension position to the setting value in the reduced analysis degree-of-freedom space.

* * * * *